United States Patent
Xu et al.

(10) Patent No.: US 9,668,083 B2
(45) Date of Patent: May 30, 2017

(54) SYSTEMS AND METHODS FOR COOPERATIVE APPLICATIONS IN COMMUNICATION SYSTEMS

(71) Applicant: Taiwan Semiconductor Manufacturing Co., Ltd., Hsinchu (TW)

(72) Inventors: Haibo Xu, San Diego, CA (US); Gopinath Murali Chinnathambi, San Diego, CA (US); David Gell, San Diego, CA (US); Kenneth L. Stanwood, San Diego, CA (US); Erik Colban, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 13/744,101

(22) Filed: Jan. 17, 2013

(65) Prior Publication Data

US 2013/0165084 A1 Jun. 27, 2013

Related U.S. Application Data

(63) Continuation-in-part of application No. 13/653,239, filed on Oct. 16, 2012.

(Continued)

(51) Int. Cl.
*G06F 15/16* (2006.01)
*H04W 4/00* (2009.01)
*H04L 29/08* (2006.01)

(52) U.S. Cl.
CPC ............. *H04W 4/003* (2013.01); *H04L 67/02* (2013.01)

(58) Field of Classification Search
CPC ......................................................... H04L 67/10

(Continued)

(56) References Cited

U.S. PATENT DOCUMENTS 9,232,525 B2 * 1/2016 Meredith .............. H04W 48/18
2001/0047423 A1 11/2001 Shao (Continued)

FOREIGN PATENT DOCUMENTS

GB 2481659 A 1/2012
WO 02/073366 A2 9/2002

(Continued)

OTHER PUBLICATIONS

International Search Report and Written Opinion for related international application No. PCT/US13/043095, mailed on Sep. 19, 2013, in 13 pages.

(Continued)

*Primary Examiner* — Wing F Chan
*Assistant Examiner* — Andrew Woo
(74) *Attorney, Agent, or Firm* — Jianq Chyun IP Office

(57) ABSTRACT

Systems and methods provide communications between applications in terminal nodes and applications agents in access nodes. The APP-agent cooperative communications can be used to improve quality of experience for users or the terminal nodes. An access node may, for example, have a parameterized scheduling system that incorporates information from the APP-agent cooperative communications in determining scheduling parameters. An application at a terminal node may, for example, modify requests for communication based on information about communication capabilities received from an access node. For APP-agent cooperative communications for multiple applications, an access node may include a master application agent to facilitate and coordinate communications to specific appli- (Continued)

cation agents that address APP-agent cooperative communications for specific applications. Similarly, a terminal node may use a master application and specific applications for APP-agent cooperative communications.

40 Claims, 7 Drawing Sheets

Related U.S. Application Data

(60) Provisional application No. 61/658,774, filed on Jun. 12, 2012, provisional application No. 61/579,324, filed on Dec. 22, 2011.

(58) Field of Classification Search
USPC .................................................. 709/201, 202
See application file for complete search history.

(56) References Cited

U.S. PATENT DOCUMENTS

| | | |
|---|---|---|
| 2004/0033806 A1* | 2/2004 | Daniel et al. ................. 455/450 |
| 2005/0054289 A1 | 3/2005 | Salazar et al. |
| 2005/0055708 A1 | 3/2005 | Gould |
| 2006/0264219 A1* | 11/2006 | Satt ........................ H04L 47/10 455/452.2 |
| 2007/0174428 A1 | 7/2007 | Lav Ran et al. |
| 2007/0268860 A1 | 11/2007 | Taneja |
| 2008/0186918 A1 | 8/2008 | Tinnakornsrisuphap et al. |
| 2008/0225706 A1* | 9/2008 | Lange ........................... 370/230 |
| 2009/0238098 A1 | 9/2009 | Cai |
| 2009/0252134 A1* | 10/2009 | Schlicht ................ H04L 1/0015 370/338 |
| 2010/0002692 A1* | 1/2010 | Bims ............................. 370/389 |
| 2010/0177650 A1 | 7/2010 | Wittgreffe |
| 2010/0268836 A1* | 10/2010 | Jabri ........................ H04L 47/38 709/231 |
| 2011/0043357 A1 | 2/2011 | Peatfield |
| 2011/0179320 A1 | 7/2011 | Quere et al. |
| 2011/0209201 A1* | 8/2011 | Chollat ............. G06F 17/30241 726/4 |
| 2011/0275379 A1* | 11/2011 | Hakola ............... H04W 72/042 455/450 |
| 2011/0307900 A1 | 12/2011 | Fatehpuria |
| 2012/0155398 A1* | 6/2012 | Oyman ................... H04L 47/26 370/329 |
| 2012/0163203 A1 | 6/2012 | Wilkinson et al. |
| 2013/0100819 A1* | 4/2013 | Anchan et al. ............... 370/241 |

FOREIGN PATENT DOCUMENTS

| | | |
|---|---|---|
| WO | 2006/136926 A2 | 12/2006 |
| WO | 2010/112074 A1 | 10/2010 |

OTHER PUBLICATIONS

International Search Report and Written Opinion for related international application No. PCT/US13/043042, mailed on Sep. 19, 2013, in 13 pages.

Aloui et al. "Architecture for Mobile Business based on mobile agent." IEEE 2012 International Conference on Multimedia Computing and Systems. May 10, 2012. pp. 954-958.

Fitchard. "Examining Intel's conception of the radio access network." Connected Planet. Jun. 16, 2011, 3 pages. Retrieved from http://connectedplanetonline.com/residential_services/news/Examining-Intels-conception-of-the-radio-access-network-0616/.

Schulzrinne et al. "RTP Profile for Audio and Video Conferences with Minimal Control." The Internet Society. RFC 3551. Jul. 2003, 38 pages.

Felix. "Introduction to Video Transcoding of MCLAB Seminar Series." 42 pages. Date unknown.

Ortiva Wireless, Inc.. "Defining Quality of Experience for Video Delivered over Mobile Networks." 4 pages. Date unknown.

Cisco Systems, Inc. "Optimizing Enterprise Video Over Wireless LAN." White Paper, 11 pages. 2010.

Wirth et al. "Advanced Downlink LTE Radio Resource Management for HTTP-Streaming." Proceedings of the 20th ACM International Conference on Multimedia. Oct. 29-Nov. 2, 2012. pp. 1037-1040.

* cited by examiner

SYSTEMS AND METHODS FOR COOPERATIVE APPLICATIONS IN COMMUNICATION SYSTEMS

CROSS-REFERENCE TO RELATED APPLICATIONS

This application is a continuation in part of U.S. patent application Ser. No. 13/653,239, filed Oct. 16, 2012 and titled "System and Method for Cooperative Applications in a Communication System," which claims the benefit of U.S. provisional application Ser. No. 61/658,774, filed Jun. 12, 2012 and titled "System and Method for Cooperative Applications in a Communication System" and U.S. provisional application Ser. No. 61/579,324, filed Dec. 22, 2011 and titled "Congestion Induced Video Scaling," all of which are hereby incorporated by reference.

BACKGROUND

The present invention generally relates to the field of communication systems and to systems and methods for cooperative applications in communication systems.

In a communication network, such as an Internet Protocol (IP) network, each node and subnet has limitations on the amount of data that can be effectively transported at any given time. In a wired network, this is often a function of equipment capability. For example, a gigabit Ethernet link can transport no more than 1 billion bits of traffic per second. In a wireless network the capacity is limited by the channel bandwidth, the transmission technology, and the communication protocols used. A wireless network is further constrained by the amount of spectrum allocated to a service area and the quality of the signal between the sending and receiving systems. Because these aspects can be dynamic, the capacity of a wireless system may vary over time.

Historically, communication systems have segregated traffic by classes of service (CoS) in the core, such as in a packet gateway (P-GW) in an LTE system. This has the benefit that operator provided services such as voice and video from the operator's own or coordinated content delivery network (CDN) are able to be given quality of service (QoS) guarantees such as guaranteed bit rates (GBR). Traffic not associated with operator provided services is typically less differentiated, leading to heterogeneous traffic grouped into the same CoS. Further, this traffic is often provided resources on a best effort basis, ignoring the QoS needs of the specific application generating the traffic, and ignoring the quality of experience (QoE) perceived by the end user.

Additional communication traffic may be from over-the-top (OTT) services, that is, services that are not operator provided or coordinated. Skype voice over internet protocol (VoIP), YouTube progressive download video, Netflix streaming video, and Pandora radio streaming audio are examples of OTT services. OTT voice and video services tend to be grouped together as best effort traffic along with email, social networking, and file transfer. When a network becomes congested, the OTT services are typically all treated the same regardless of the impact in perceived quality by the end user. They are typically scheduled as the same CoS. Additionally, OTT services are typically grouped into the same logical bearer. In today's communications systems, admission control is performed on a logical bearer basis without regard to the mix of services on the bearer. Consequently, real-time services such as voice, streaming video, and streaming audio are perceived to have a substantial degradation in QoE relative to non-real-time services such as email.

SUMMARY

Systems and methods for cooperative applications in communication systems are provided. In one aspect, the invention provides an access node including: a transceiver module configured to communicate with terminal nodes; a processor coupled to the transceiver and configured to receive from the terminal nodes information about applications at the terminal nodes, receive from the terminal nodes requests for data from one or more application servers, transmit the requests for data to the application servers, receive data from the application servers in response to the requests for data, and transmit the data received from the application servers to the terminal nodes; and a backhaul module coupled to the processor and configured to provide communications with the application servers.

In another aspect, the invention provides an access node, including: a transceiver module configured to communicate with terminal nodes; a processor coupled to the transceiver module and configured to transmit to the terminal nodes information about capabilities for communication with the terminal nodes, receive from the terminal nodes requests for data from one or more application servers, the requests being from applications at the terminal nodes, transmit the requests for data to the application servers, receive data from the application servers in response to the requests for data, and transmit the data received from the application servers to the terminal nodes, a backhaul module coupled to the processor and configured to provide communications with the application servers.

In another aspect, the invention provides a terminal node including a transceiver module configured to communicate with an access node; and a processor coupled to the transceiver and configured to receive from the access node information about capabilities for communication with the terminal node, and request communications from an application server via the access node, the requested communications being for an application, the request being for an application and having characteristics that utilize the information about capabilities for communication.

In another aspect, the invention provides a terminal node including: a transceiver module configured to communicate with an access node; and a processor coupled to the transceiver module and configured to request communications from an application server via the access node, the requested communications being for an application, and transmit information about the application to the access node, the information about the application being for use by the access node in communicating with the terminal node.

In another aspect, the invention provides a method for use in communicating between an access node and a terminal node. The method includes: establishing an APP-agent cooperative communications control path between the access node and the terminal node, the APP-agent cooperative communications control path communicating from the terminal node to the access node information about an application at the terminal node and communicating information from the access node to the terminal node about capabilities for communication with the terminal node; transmitting, from the terminal node to the access node, a request for data from an application server, the request being from an application at the terminal node; transmitting, from the access node, the request for data to the application server; receiving, at the access node, data from the application server in response to the request for data; and transmitting, from the access node to the terminal node, the data received from the application server.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Systems and methods for communication systems having scheduling and admission control functions that are aware of application needs are provided. Cooperation and communication between user equipment applications and application-aware base stations (or other network nodes) can improver users' quality of experience (QoE). The systems and method are particularly useful in capacity and spectrum constrained, multiple-access communication systems. The systems and methods disclosed herein can be used with classes of service that contain data streams or flows from heterogeneous applications.

The systems and methods disclosed herein can be applied to various capacity-limited communication systems, including wireline and wireless technologies. For example, the systems and methods disclosed herein can be used with Cellular 2G, 3G, 4G (including Long Term Evolution (LTE), LTE Advanced, and WiMAX), cellular backhaul, Wi-Fi, Ultra Mobile Broadband (UMB), cable modem, and other point-to-point or point-to-multipoint wireline or wireless technologies. For concise exposition, various embodiments are described using terminology and organization of particular technologies and standards. However, the systems and methods described herein are broadly applicable to other technologies and standards.

Figure 1:
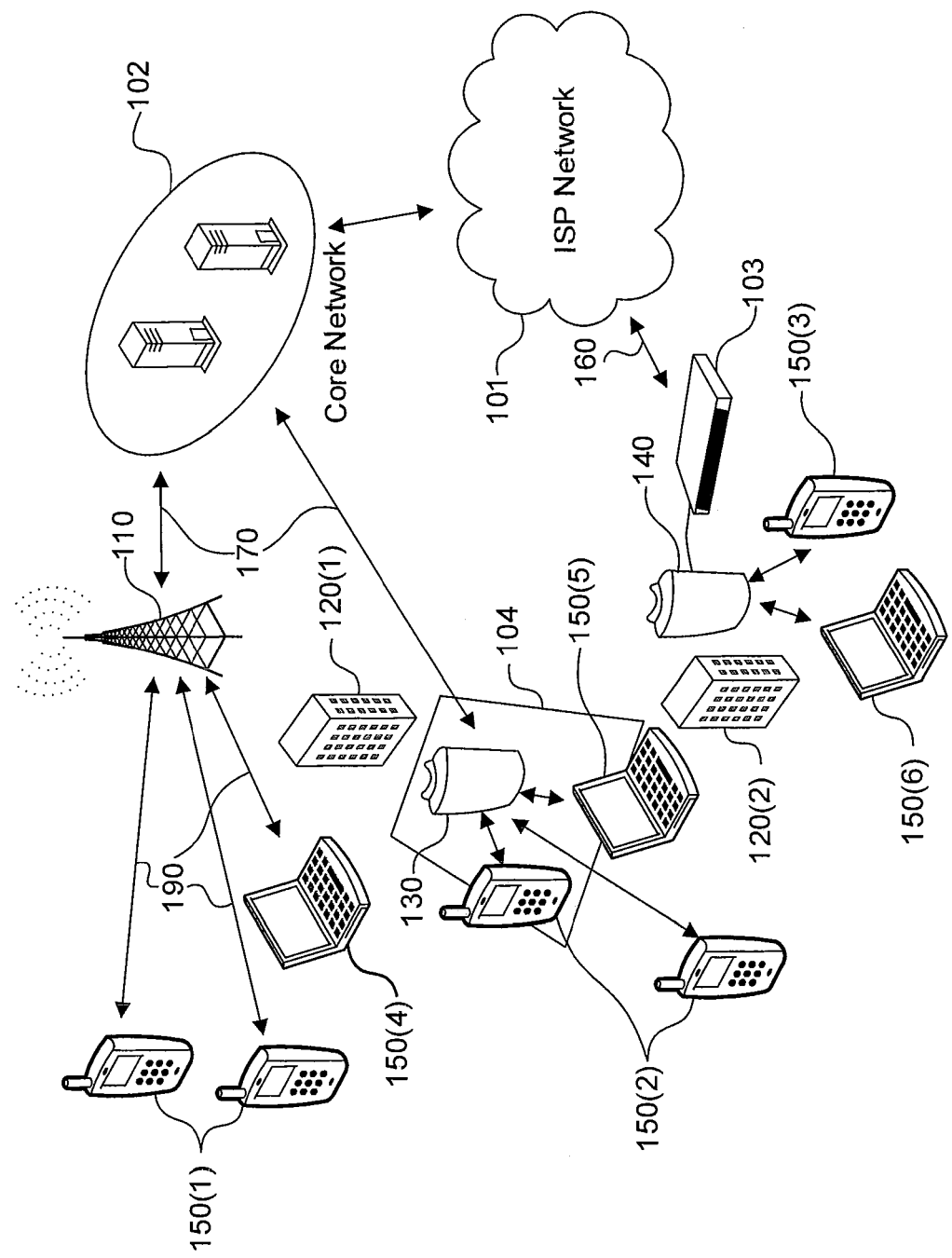
FIG. 1 is a block diagram of a communication network in which systems and methods disclosed herein can be implemented in accordance with aspects of the invention.

FIG. 1 is a block diagram of a communication network in which systems and methods disclosed herein can be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations 150 (1) and 150(4) can connect to the core network 102 through the macro base station 110. Wireless links 190 between subscriber stations 150 and the macro base station 110 are bidirectional point-to-multipoint links, in an embodiment. The direction of the wireless links 190 from the macro base station 110 to the subscriber stations 150 is referred to as the downlink or downstream direction. The direction of the wireless links 190 from the subscriber stations 150 to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations, such as the macro base station 110, as a bridge. That is to say, the base stations generally pass user application data and any user application control messages between the subscriber stations 150 and the core network 102 without the base station being a destination for the data and control messages or a source of the data and control messages.

In the network configuration illustrated in FIG. 1, an office building 120(1) causes a coverage shadow 104. A pico station 130 can provide coverage to subscriber stations 150(2) and 150(5) in the coverage shadow 104. The pico station 130 is connected to the core network 102 via a backhaul connection 170. The subscriber stations 150(2) and 150(5) may be connected to the pico station 130 via links that are similar to or the same as the wireless links 190 between subscriber stations 150(1) and 150(4) and the macro base station 110.

In office building 120(2), an enterprise femtocell 140 provides in-building coverage to subscriber stations 150(3) and 150(6). The enterprise femtocell 140 can connect to the core network 102 via an internet service provider network 101 by utilizing a broadband connection 160 provided by an enterprise gateway 103.

To aid in allocating scarce communication resources, prior communication systems have segregated traffic by classes of service (CoS) in the core network, such as in a packet gateway (P-GW) in an LTE system. Traffic within a CoS is often treated similarly for the purpose of scheduling resource allocations. Traffic in different CoS is often treated separately for the purpose of scheduling resource allocations. This allows operator provided services, such as voice and video from the operator's own or coordinated content delivery network (CDN), to be given QoS guarantees such as guaranteed bit rates (GBR).

Traffic not associated with operator provided services may be referred to as over-the-top (OTT) traffic. Prior systems typically have little or no differentiation between various types of OTT traffic. Thus, heterogeneous traffic may be grouped into the same CoS. Further, this traffic is often provided resources on a best effort basis with, for example, no guaranteed bit rates. Thus, prior systems ignore QoS needs of the specific application generating the OTT traffic and ignore the quality of experience (QoE) perceived by the end user. In particular, OTT voice and video services such as Skype voice over IP (VoIP), YouTube progressive download video, Netflix streaming video, Facetime conversational video, and Pandora radio streaming audio may have been grouped together as best effort traffic along with email, social networking, and file transfer. When the network becomes congested, these services are typically all treated the same regardless of the impact in perceived quality by the user. Consequently, real-time services (for example, voice, streaming video, and streaming audio) are perceived to have a substantial degradation in QoE relative to non-real-time services (for example, email).

In the communication network of FIG. 1, and in other wired and wireless networks, one or more data streams or services can be assigned an importance and a desired level of performance. The importance and desired level of performance may be used to assign packets from each data stream to a scheduling group and data queue. A scheduling algorithm can also use the information to decide which queues (and therefore which data streams and packets) to treat preferentially to others.

The scheduling algorithms may use scheduling weights to convey the importance and desired level of service of each queue. For example, weighted round robin (WRR) and weighted fair queuing (WFQ) scheduling methods, which both use weights to adjust service among data queues, can be used. Scheduling algorithms may also convey the importance and desired level of service of each queue through the use of credits and debits. For example, a proportional fair scheduler (PFS) method may use credits and debits to adjust service among data queues. Scheduling algorithms may use weights and convert the weights to credits in the form of numbers of packets or bytes to be served during a scheduling round.

Nodes in the communication network may improve QoE by using an application factor (AF) to dynamically modify the weights or credits used to allocate resources in a scheduler. The AF may be related to the current level of session QoE. A larger AF may be applied for sessions with low QoE thereby increasing resource allocation. Conversely, a smaller AF may be applied for sessions with high QoE thereby reducing the resources assigned to the session and freeing resources for use by other sessions. Devices in the communication network may use methods for scheduling described in U.S. patent application Ser. No. 13/607,559, filed Sep. 7, 2012 and titled "Systems and Methods for Congestion Detection for use in Prioritizing and Scheduling Packets in a Communication Network," which is hereby incorporated by reference.

The subscriber stations 150 and communication nodes in the network of FIG. 1 (such as the macro base station 110, the pico station 130, the enterprise gateway 103, the enterprise femtocell 140, devices in the core network 102, and devices in the internet service provider network 101) may communicate application related information. Cooperation between applications in the subscriber stations and application agents in the communication nodes can improve performance of the communication network including the user experience. The application related information can be derived through the inspection of packets passing through the communication nodes. For many applications there may be additional information, such as client side buffer occupancy, residing in an application in a subscriber station that may allow for more efficient or improved communications. Similarly, there may be information, such as congestion state information, available in a communication node that could aid an application in making more intelligent resource requests which would, in turn, lead to improved performance by the communication node, for example, in scheduler and admission control functions. For example, the communication system may use application information and congestion information to improve communication channel resource allocation and to determine which sessions to admit, deny, or modify.

Application related communication or cooperation between client side applications and communication node scheduling and admission control functions can improve QoE for users. Application related communication and cooperation can improve QoE even when QoS resource guarantees are available. For example, the resource guarantees may not comprehend instantaneous conditions such as congestion, peak versus average bit rates, and heterogeneity of data between applications.

Figure 2:
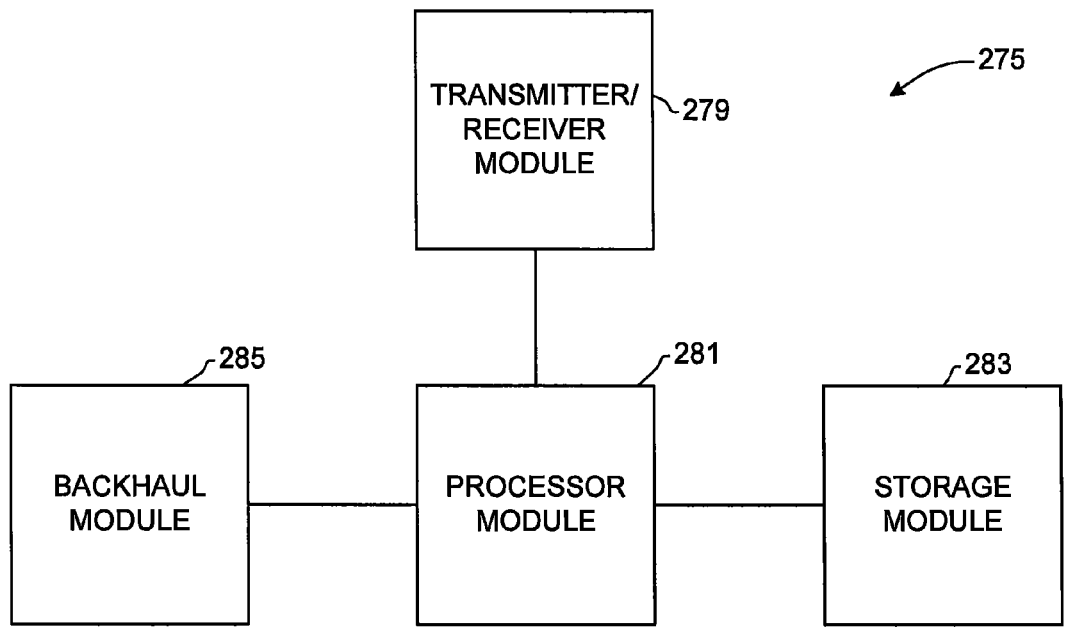
FIG. 2 is a block diagram of an access node in accordance with aspects of the invention.

FIG. 2 is a functional block diagram of an access node 275 in accordance with aspects of the invention. In various embodiments, the access node 275 may be a mobile WiMAX base station, a global system for mobile (GSM) wireless base transceiver station (BTS), a Universal Mobile Telecommunications System (UMTS) NodeB, an LTE evolved Node B (eNB or eNodeB), a cable modem head end, or other wireline or wireless access node of various form factors. For example, the macro base station 110, the pico station 130, or the enterprise femtocell 140 of FIG. 1 may be provided, for example, by the access node 275 of FIG. 2. The access node 275 includes a processor module 281. The processor module 281 is coupled to a transmitter-receiver (transceiver) module 279, a backhaul interface module 285, and a storage module 283.

The transmitter-receiver module 279 is configured to transmit and receive communications with other devices. In many embodiments, the communications are transmitted and received wirelessly. In such embodiments, the access node 275 generally includes one or more antennae for transmission and reception of radio signals. In other embodiments, the communications are transmitted and received over physical connections such as wires or optical cables. The communications of the transmitter-receiver module 279 may be with terminal nodes.

The backhaul interface module 285 provides communication between the access node 275 and a core network. The communication may be over a backhaul connection, for example, the backhaul connection 170 of FIG. 1. Communications received via the transmitter-receiver module 279 may be transmitted, after processing, on the backhaul connection. Similarly, communication received from the backhaul connection may be transmitted by the transmitter-receiver module 279. Although the access node 275 of FIG. 2 is shown with a single backhaul interface module 285, other embodiments of the access node 275 may include multiple backhaul interface modules. Similarly, the access node 275 may include multiple transmitter-receiver modules. The multiple backhaul interface modules and transmitter-receiver modules may operate according to different protocols.

The processor module 281 can process communications being received and transmitted by the access node 275. The storage module 283 stores data for use by the processor module 281. The storage module 283 may also be used to store computer readable instructions for execution by the processor module 281. The computer readable instructions can be used by the access node 275 for accomplishing the various functions of the access node 275. In an embodiment, the storage module 283 or parts of the storage module 283 may be considered a non-transitory machine readable medium. For concise explanation, the access node 275 or embodiments of it are described as having certain functionality. It will be appreciated that in some embodiments, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

The access node 275 may communicate application related information with other devices. The access node 275 may receive application related information from other devices, transmit application related information to other devices, or both. For example, an application in a terminal node may cooperatively operate with the access node 275 to improve QoE for the user of the terminal node.

Figure 3:
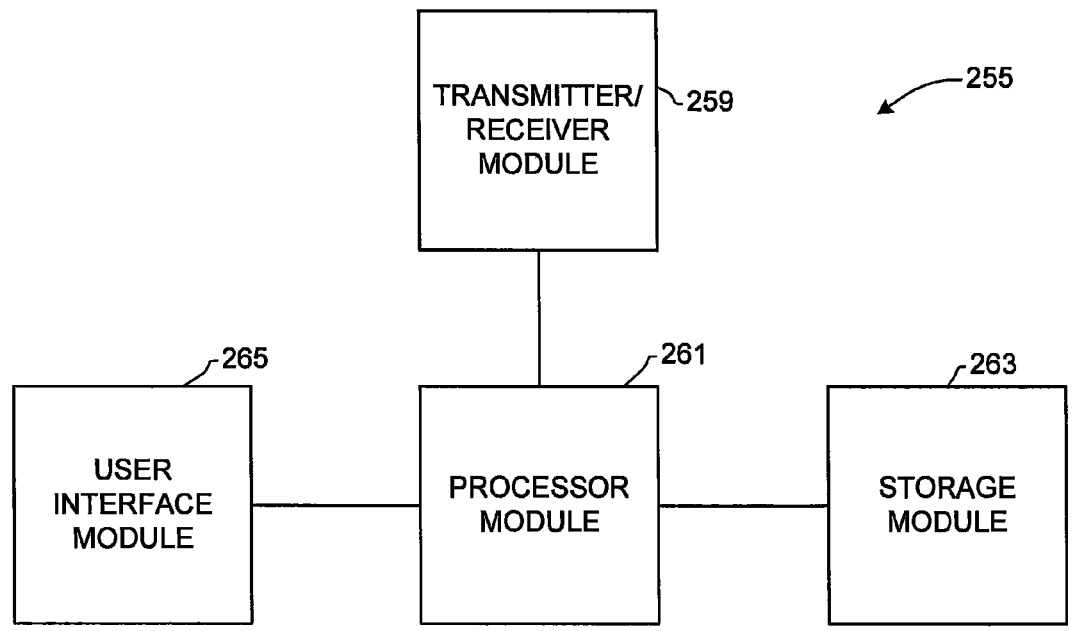
FIG. 3 is a block diagram of a terminal node in accordance with aspects of the invention.

FIG. 3 is a functional block diagram of a terminal node 255 in accordance with aspects of the invention. In various embodiments, the terminal node 255 may be a mobile WiMAX subscriber station, a GSM cellular phone, a UMTS cellular phone, an LTE user equipment, a cable modem, or other wireline or wireless terminal node of various form factors. The subscriber stations 150 of FIG. 1 may be provided, for example, by the terminal node 255 of FIG. 3. The terminal node 255 includes a processor module 261. The processor module 261 is coupled to a transmitter-receiver module (transceiver) 259, a user interface module 265, and a storage module 263.

The transmitter-receiver module 259 is configured to transmit and receive communications with other devices. For example, the transmitter-receiver module 259 may communication with the access node 275 of FIG. 2 via its transmitter-receiver module 279. In embodiments where the communications are wireless, the terminal node 255 generally includes one or more antennae for transmission and reception of radio signals. In other embodiments, the communications are transmitted and received over physical connections such as wires or optical cables. Although the terminal node 255 of FIG. 3 is shown with a single transmitter-receiver module 259, other embodiments of the terminal node 255 may include multiple transmitter-receiver modules. The multiple transmitter-receiver modules may operate according to different protocols.

The terminal node 255, in many embodiments, provides data to and receives data from a person (user). Accordingly, the terminal node 255 includes the user interface module 265. The user interface module 265 includes modules for communicating with a person. The user interface module 265, in an embodiment, includes a speaker and a microphone for voice communications with the user, a screen for providing visual information to the user, and a keypad for accepting alphanumeric commands and data from the user. In some embodiments, a touch screen may be used in place of or in combination with the keypad to allow graphical inputs in addition to alphanumeric inputs. In an alternative embodiment, the user interface module 265 includes a computer interface, for example, a universal serial bus (USB) interface, to interface the terminal node 255 to a computer. For example, the terminal node 255 may be in the form of a dongle that can be connected to a notebook computer via the user interface module 265. The combination of computer and dongle may also be considered a terminal node. The user interface module 265 may have other configurations and include functions such as vibrators, cameras, and lights.

The processor module 261 can process communications being received and transmitted by the terminal node 255. The processor module 261 can also process inputs from and outputs to the user interface module 265. The storage module 263 stores data for use by the processor module 261. The storage module 263 may also be used to store computer readable instructions for execution by the processor module 261. The computer readable instructions can be used by the terminal node 255 for accomplishing the various functions of the terminal node 255. In an embodiment, the storage module 263 or parts of the storage module 263 may be considered a non-transitory machine readable medium. For concise explanation, the terminal node 255 or embodiments of it are described as having certain functionality. It will be appreciated that in some embodiments, this functionality is accomplished by the processor module 261 in conjunction with the storage module 263, the transmitter-receiver module 259, and the user interface module 265. Furthermore, in addition to executing instructions, the processor module 261 may include specific purpose hardware to accomplish some functions.

The terminal node 255 may communicate application related information with other devices. The terminal node 255 may receive application related information from other devices, transmit application related information to other devices, or both. For example, an application agent in an access node may cooperatively operate with the terminal node 255 to improve QoE for the user of the terminal node.

Figure 4:
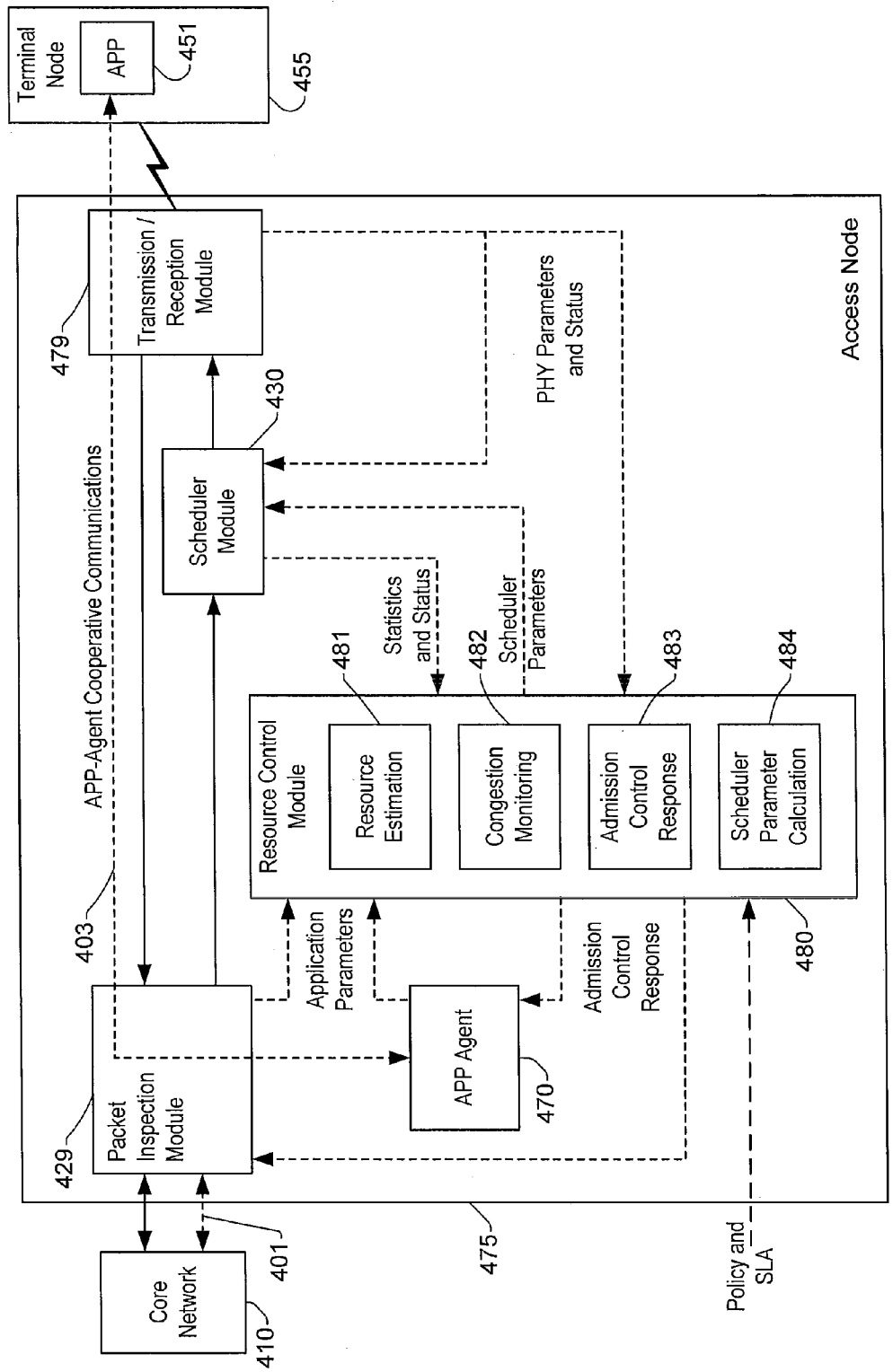
FIG. 4 is a diagram illustrating aspects of an access node in accordance with aspects of the invention.

FIG. 4 is a diagram illustrating aspects of an access node 475 in accordance with aspects of the invention. The access node 475 communicates with a terminal node 455 and a core network 410. The macro base station 110, the pico station 130, the enterprise femtocell 140, or the enterprise gateway 103 of FIG. 1, in some embodiments, are implemented using the access node 475. The access node 475 may be implemented, for example, using the access node 275 of FIG. 2. The core network 410 may also be a service provider network, the Internet, or a combination of networks. To aid in understanding, in FIG. 4, solid lines represent user data and dashed lines represent control data. The distinction between user data and control data is from the point of view of the access node 475. Since the access node 475 acts as a bridge, there may be control data from the terminal node 455 to some entity, such as a video server, in the core network 410 that is perceived by the access node 475 as user data.

The access node 475 of FIG. 4 facilitates communication between the terminal node 455 and entities in core network 410 and beyond (for example, entities accessed via the Internet such as video servers). An application 451 in the terminal node 455 communicates with a server application in, or connected to, the core network 410 via the access node 475. The application 451 provides some functionality or service for a user of the terminal node 455. For example, the application 451 may be a software program executed by the terminal node 455. The application 451 in the terminal node 455 also communicates with an application agent 470 in the access node 475. The application 451 may be a module provided, for example, by the processor module 261 of the terminal node 255 of FIG. 3 using instructions from the storage module 263. The application agent 470 may be a module provided, for example, by the processor module 281 of the access node 275 of FIG. 2 using instructions from the storage module 283.

The application 451 and the application agent 470 communicate via an APP-agent cooperative communication control path 403. Communications between the application 451 and the application agent 470 may provide improved communication system performance, for example, improved QoE for the user of the terminal node 455. Applications that provide communications on the APP-agent cooperative communication control path 403 may be considered enhanced or cooperative applications.

Although FIG. 4 illustrates single instances of each element, in an embodiment, there may be multiple instances of various elements. For example, the access node may concurrently communicate with multiple terminal nodes, and each of the terminal nodes may have multiple applications that may concurrently cooperate with one or more application agents in one or more access nodes.

The access node 475 includes a packet inspection module 429, a scheduler module 430, and a transmission/reception module (transceiver) 479. The packet inspection module 429, the scheduler module 430, and the transmission/reception module 479 are used by the access node 475 in communicating with the terminal node 455. The transmission/reception module 479 provides communications with the terminal node 455. The transmission/reception module 479 may, for example, implement a radio access network physical layer. The access node 475 also includes a resource control module 480 that is responsible for various aspects of resource control. The application agent 470 may also communicate with the resource control module 480.

The packet inspection module 429 is in a data path between the core network 410 and the terminal node 455. In the downlink direction, the packet inspection module 429 receives data from the core network 410 and decides what to do with the data. For example, user data bound for the terminal node 455 may be segregated into queues at the scheduler module 430 for transmission to the terminal node 455 via the transmission/reception module 479. The segregation into queues may be based on various characteristics associated with the user data, such as logical link, IP source and destination addresses, or application class. In an embodiment, the packet inspection module 429 is part of or coupled to a data bridge/relay module. The packet inspection module 429 may also include a routing function performed before or after the data bridge/relay module.

Some data from the core network may be control data intended for control and configuration of the access node 475. This data may be directed to various control or management modules of the access node 475, for example, the resource control module 480.

The scheduler module 430 implements some or all of the functionality required to allocate physical resources across the communication link between the access node 475 and the terminal node 455. The scheduler module 430 is typically associated with or part of a medium access control (MAC) layer. For the downlink direction, the scheduler module 430 decides which data to transmit and at what point in time. The resources may be allocated, for example, as subcarriers and timeslots. The scheduler module 430 may also process uplink resource requests from the terminal node 455 and grant uplink bandwidth. The scheduler module 430 may use PHY information from the transmission/reception module 479, such as modulation and coding scheme, to determine the amount of resources to allocate to specific user data. The scheduler module 430 may also inform the resource control module 480 of congestion occurring on the communication link or statistics relating to congestion monitoring (for example, buffer occupancy and egress rates). In an embodiment, the scheduler module 430 may receive updates to scheduler parameters, such as changes to weights and credits, from the resource control module 480.

The packet inspection module 429 may also detect applications and provide application information, such as application class, specific application, data rates, and durations, to the resource control module 480. In an embodiment, the packet inspection module 429 may receive admission control response information and aid in implementing the admission control response, such as blocking packets for a particular connection or session.

The resource control module 480 shown in FIG. 4 includes a resource estimation module 481, a congestion monitoring module 482, an admission control response module 483, and a scheduler parameter calculation module 484. The resource estimation module 481 estimates the expected resource needs of currently active applications. The resource estimation module 481 may use application parameters, such as expected data rate, and PHY parameters, such as changes in modulation and coding for the terminal node 455, to estimate the expected resource needs. Any excess in resources can be available to new applications or available to increase the resources allocated to a currently active application.

The congestion monitoring module 482 monitors the current state of congestion. The current state of congestion may vary from the resource estimation performed by the resource estimation module 481. For example, when a short-term change in data rate occurs (for example, a peak in the data rate for a variable data rate streaming video), information from the scheduler module 430 may indicate current congestion (for example, an increase in buffer occupancy for an application or a decrease in buffer egress rate for an application) even though the long-term resource estimation does not indicate congestion. The congestion monitoring module 482 may also maintain historical congestion information that may be used in predicting congestion.

The admission control response module 483 may create control responses to admit, deny, delay, or modify logical links, connections, and/or streams thereby creating control responses for sessions. The admission control response module 483 may create the control responses using various information, for example, policies (e.g., priority of users or acceptable level of user QoE), service level agreement (SLA) information, application parameters (e.g., specific application or data rate), resource estimates, APP-agent cooperative communications, and congestion indicators.

The scheduler parameter calculation module 484 may calculate modifications to scheduler parameters, such as weights and credits. The scheduler parameter calculation module 484 may calculate the modifications using various information, for example, APP-agent cooperative communications, policies, SLA information, application parameters, resource estimates, congestion indicators, and control responses (e.g., admission control responses).

The transmission/reception module 479, in addition to facilitating uplink and downlink data transfer, may monitor or maintain physical layer (PHY) parameters and status, such as modulation, coding, and signal-to-noise ratio (SNR) associated with communication with the terminal node 455. Capabilities of the access node 475 to communicate with terminal nodes depend in part on the PHY parameters and status. Information about PHY parameters and status may be made available to the scheduler module 430 to make scheduling decisions and to the resource control module 480 to calculate scheduler parameter adjustments or to determine admission control responses. The transmission/reception module 479 may also facilitate or generate communication between radio access protocol modules in the access node 475 and the terminal node 455.

In the uplink direction, the packet inspection module 429 receives user data from the terminal node 455 via the transmission/reception module 479 and forwards the user data to the core network 410. The packet inspection module 429 also receives communications from the terminal node 455 destined for the application agent 470. The packet inspection module 429 can identify these communications and forwards them to the application agent 470.

The application agent 470 and the application 451 establish the APP-agent cooperative communication control path 403. The APP-agent cooperative communication control path 403 can be, for example, a TCP connection. The APP-agent cooperative communication control path 403 is used for exchanging APP-agent cooperative communications. Routing of data on the APP-agent cooperative communication control path 403 may be facilitated by the packet inspection module 429. Alternatively, the routing may be facilitated by a routing function that can be internal or external to the access node 475.

APP-agent cooperative communications from the application 451 to the application agent 470 can include, for example, information that allows the access node 475 to improve admission control and scheduling. The communications between the application agent 470 and the application 451 can, for example, provide additional information to the resource control module 480.

As an introductory example of APP-agent cooperative communications, consider a communication network where the application 451 provides YouTube streaming video to the user of the terminal node 455. The streaming video may be available in multiple formats with different associated data rates. Information about the formats may be communicated by a YouTube specific application to a YouTube aware application agent that may, in turn, provide the information about the formats to the resource control module. The resource control module can use the application information to generate an admission control response that indicates which formats, if any, fit with current estimates of available resources. The YouTube aware application agent may process the admission control response into APP-agent cooperative communications to the YouTube specific application specifying which formats are currently allowable. In various embodiments, the specific choice of format may be made by the application agent or by the application and communicated back to application agent. The application agent may inform the resource control module of the chosen format and associated data rate. The resource control module updates resource estimates and scheduler parameters to reflect the chosen format.

FIG. 4 illustrates a particular allocation of functions to various modules and a particular distribution of modules in various communication nodes. Many other arrangements may also be used. For example, all or parts of the packet inspection module 429, the application agent 470, and the resource control module 480 could be in a gateway node in the core network, for example, in a serving gateway (S-GW) or a packet gateway (P-GW) in an LTE network. Additionally, there may be intermediate devices between the access node 475 and the core network 410 and terminal node 455. Many combinations of applications and application agents and their related functions may also be used. For example, there may be one application agent that communicates with all applications, one application agent for each particular application (e.g., a YouTube application agent, a Pandora application agent, etc.), one application agent for each terminal node, or one application agent for each application (e.g., a YouTube application agent for a first terminal node and another YouTube application agent for a second terminal node). When there are multiple applications and application agents, there may be individual communications connections (e.g., TCP/IP connections) between each pair of application and application agent. Alternatively, communication between multiple applications and application agents may be aggregated and carried via a reduced number of connections. For example, a single TCP/IP connection may be used to communicate between multiple application agents and applications for a specific terminal node.

The application agent 470 can perform connection life cycle management and segment buffering and reordering for TCP/IP connections and other connections using connection-oriented and byte stream based protocols, for example, by using an instance of a TCP stack. Alternatively, the APP-agent cooperative communications may use a simplified communication connection, for example, UDP/IP.

Figure 5:
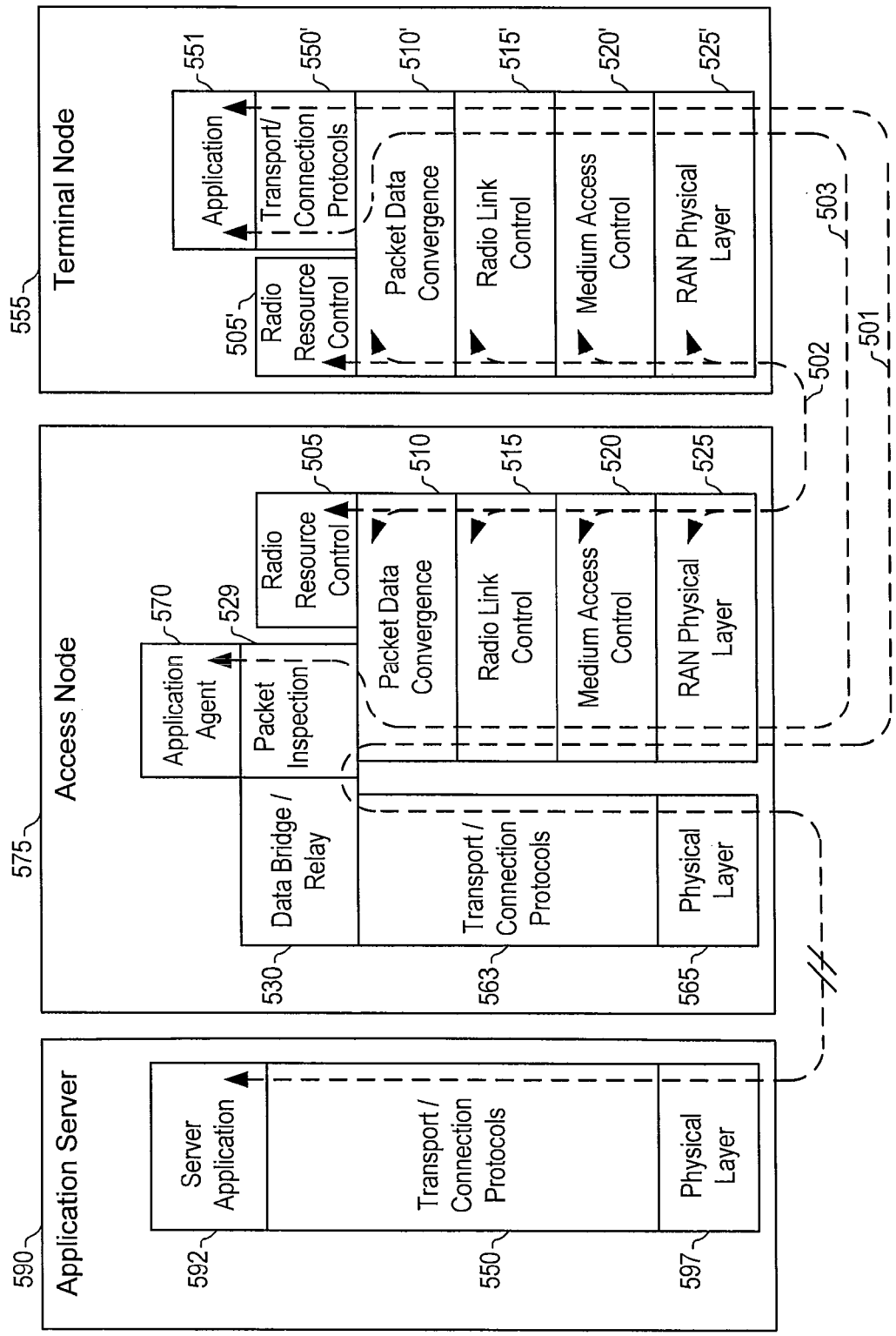
FIG. 5 is a block diagram of a communication system that shows control plane relationships in accordance with aspects of the invention.

FIG. 5 is a block diagram of a communication system that shows control plane relationships in accordance with aspects of the invention. The communication system includes a terminal node 555, an access node 575, and an application server 590. The terminal node 555 includes an application 551 that communicates with a server application 592 in the application server 590. The communication is via the access node 575. The application 551 also communicates with an application agent 570 in the access node 575.

The exemplary protocols, control plane relationships, and other descriptions of FIG. 5 may be used to further understand aspects related to the access node 475 of FIG. 4. The access node 475 of FIG. 4 may be similar to or the same as the access node 575 of FIG. 5. The terminal node 455 of FIG. 4 may be similar to or the same as the terminal node 555 of FIG. 5. Similarly, communications between the access node 575 and the application server 590 may utilize a network similar to or the same as the core network 410 of FIG. 4. Furthermore, the application server 590 of FIG. 5 may be in or connected to a network similar to or the same as the internet service provider network 101 or the core network 102 of the communication network of FIG. 1. The application server may also be a network of separately located servers. While the communication system of FIG. 4 uses LTE protocol stacks, other communication systems may use other protocol stacks. There could be more or fewer protocol layers, the layer names and terminology could be different, the functionality could be different, and in which layer a function resides could be different.

Devices in a communication network commonly communicate on communication paths through multi-layered protocols. Protocol stacks in the communicating devices implement the protocols. For example, an application data path 501 conveys communications between the terminal node 555 and the application server 590 via the access node 575 using protocol stacks in each device. In addition to the protocol stacks for passing user application data and control, there may be protocol stacks for implementing and managing the communications link in support of the user application.

The access node 575 of FIG. 5 includes a radio access network (RAN) control plane protocol stack to implement the RAN control plane protocol for control plane communications between the terminal node 555 and the access node 575. The RAN control plane protocol in the access node 575 may be implemented using, for example, the processor module 281 of the access node 275 of FIG. 2 using instructions from the storage module 283. The RAN control plane protocol stack in the access node 575 includes a RAN physical (PHY) layer module 525, a medium access control (MAC) layer module 520, a radio link control (RLC) layer module 515, a packet data convergence (PDCP) layer module 510, and a Radio Resource Control (RRC) layer module 505. Each of these protocol stack layers in the access node 575 has a peer layer in the terminal node 555. Thus, the RAN control plane protocol stack in the terminal node 555 includes a PHY layer module 525', a MAC layer module 520', a RLC layer module 515', a PDCP layer module 510', and a RRC layer module 505'.

In the control plane, RAN control information is typically exchanged between higher or lower layers in the same node, logically creating peer-to-peer control links between a layer on the access node 575 and the corresponding layer on the terminal node 555. A RAN control path 502 connects the peer layers of the access node 575 and the terminal node 555. Although FIG. 5 illustrates a single terminal node 555, a RAN control plane layer on the access node 575 may have logical control links to multiple peers on multiple terminal nodes.

The peer RAN control plane layer modules exchange control information necessary to control and operate the communication link between the two devices. This control information originates and terminates within the access node 575 and the terminal node 555 and is specific to operating and managing the communication link. In contrast, user application data and application control messaging originate and terminate on the terminal node 555 and the application server 590. From the point of view of the access node 575, user application data and application control messaging may be considered to be transported on the data plane rather than the control plane.

The RAN physical layer module 525 of the access node 575 has a control message peer relationship with the RAN physical layer module 525' of the terminal node 555. The RAN physical layer module 525 of the access node 575 may, for example, request transmit power changes of the RAN physical layer module 525' of the terminal node 555. The RAN physical layer module 525' of the terminal node 555 may send radio link quality metrics, such as signal-to-noise ratio (SNR) measurements, to the RAN physical layer module 525 on the access node 575. The MAC layer module 520 of the access node 575 has a control message peer relationship with the MAC layer module 520' of the terminal node 555. The MAC layer modules may, for example, exchange resource requests and grants. The RLC layer module 515 of the access node 575 has a control message peer relationship with the RLC layer module 515' of the terminal node 555. The RLC layer module may, for example, exchange data segmentation and reassembly information. The PDCP layer module 510 of the access node 575 has a control message peer relationship with a PDCP layer module 510' of the terminal node 555. The PDCP layer modules may, for example, exchange encryption and compression information. The RRC layer module 505 of the access node 575 has a control message peer relationship with a RRC layer module 505' of the access node 575. The RRC layer modules may, for example, exchange quality of service (QoS) parameters of logical links.

The exchange of information between peer layers using control path 502 may be based on the use of one or more logical, transport and physical channels. In LTE, for example, cell-wide system information is defined at RRC layer module 505 in the access node 575 and communicated to the terminal node 555 via data sets formed as a master information block (MIB) and one or more system information blocks (SIBs). The MIB and SIBs are passed down the stack through the logical broadcast control channel (BCCH), the transport broadcast channel (BCH) and finally the physical broadcast channel (PBCH) and physical downlink shared channel (PDSCH). Control channel information which must be sent to a specific terminal node is communicated via a signaling radio bearer (SRB) connection and conveyed by the stack using the logical downlink control channel (DCCH), the transport downlink shared channel (DL-SCH) and the physical downlink shared channel (PDSCH).

For communication between the application 551 and the server application 592, a transport and connection protocols module 550' on the terminal node 555 and a peer transport and connection protocols module 550 on the application server 590 are used to establish the application data path 501. The application data path 501 transports application control data and application user data. In various embodiments, the application data path 501 may use the same or different transport and connection protocols for application control data and application user data. Additionally, the same or different instances (e.g., software processes) of the protocol stacks may be used for application control data and application user data.

The application data path 501 may be viewed as communicating user data by the RAN protocol stack. Unlike data on the RAN control path 502, data from the terminal node 555 on the application data path 501 does not terminate in the access node 575. Instead, data on the application data path 501 is bridged by a data bridge/relay module 530 to a communication link for eventual transport to the application server 590. When an application does not provide APP-agent cooperative communications, all application traffic can be bridged to the next node. For such an application, application control may be limited to communication between the application and an associated server application.

Transport to the application server 590 may involve multiple links from the access node 575, for example, through gateway node or router node. The access node 575 may use a further transport and connection protocols module 563 to communicate with a first upstream communication node via further physical layer module 565. The transport and connection protocols module 563 may, for example, use the evolved general packet radio service (GPRS) tunneling protocol (eGTP). The physical layer module 565 may, for example, transmit data on a microwave backhaul or a carrier Ethernet link. At the application server 590, the data is received via a physical layer module 597 and handed to the transport and connection protocols module 550. Accordingly, the transport and connection protocols module 550 in the application server 590 may provide protocols that are peers to the protocols used in the transport and connection protocols module 563 in the access node 575 and provide protocols for communication with other communication nodes between the application server 590 and the access node 575 in addition to the protocols for communication with the terminal node 555.

Data on application data path 501, data on the RAN control path 502, and data on APP-agent cooperative communication control path 503 is transported between the terminal node 555 and the access node 575 via the RAN protocol stacks. However, the packet inspection module 529 in the access node 575 can divert the APP-agent cooperative communications to the application agent 570. Creating and communicating messages on the APP-agent cooperative communication control path 503 may utilize additional protocols in the access node 575 that are peered to the protocols used in the transport and connection protocols module 550' in the terminal node 555. The additional protocols may be provided, for example, by the packet inspection module 529 or the application agent 570.

Networks use layers of protocols to abstract the functions of one layer from those provided by another layer. Abstraction of layers can allow greater portability of applications to different networks. Initiation and subsequent termination of flows of packets in a network may be triggered by particular applications or services. A flow of control and user data packets relating to the use of an end-user application or service is termed a session. Examples of sessions include a voice over internet protocol (VoIP) call using the Skype application from a laptop, streaming video playback using a YouTube app running on an Android-based mobile phone, and a 2-way video call using the Apple iChat application.

Network nodes, such as application servers or proxy servers, and terminal nodes, such as smart phones, tablets, or laptop computers, may initiate or participate in a session. Nodes may host one or more sessions simultaneously. The sessions may be independent from one another (e.g., a user using Facebook and email simultaneously) or related to each other (e.g., a browsing session that spawns two video streaming sessions). A session may be established between two nodes. Alternatively, a session may be viewed as a relationship between one node and many nodes through the use of, for example, multicast and broadcast packet protocols.

Sessions may be characterized or categorized by various criteria. A specific application refers to the particular application that was initiated by the user and responsible for launching the session. Examples of specific applications include a YouTube app, the Chrome internet browser, and Skype voice calling software. More generally, an application class can be used to describe an overall function served by a particular session. Example application classes include streaming video, voice calling, Internet browsing, email, and gaming.

A session may consist of one or more independent data streams using the same or potentially different underlying connections. For example, a single VoIP phone call session may contain two data streams. One data stream may serve the bidirectional voice traffic (i.e., payload or data plane packets) using a user datagram protocol (UDP) connection. A second data stream may use one or more transmission control protocol (TCP) connections for control data to handle call setup/teardown (i.e., signaling or control plane packets) as, for example, when using the session initiation protocol (SIP). In the example of video Skype, there may be one stream to carry SIP signaling, to start, stop, and otherwise control the session, a second stream to carry voice packets using the Real-Time Transport protocol (RTP), and a third stream to carry video packets using RTP.

When an application is initiated by a user on a terminal node, the application may start with control signaling between the application and an associated application server. For example, when a YouTube app is started, it requests information on available video feed selections from a YouTube feed server with multiple simultaneous hypertext transfer protocol (HTTP) requests. The YouTube feed server replies with data about the feeds in a compressed format in HTTP responses. Each HTTP request/response is performed on separate TCP connections which are setup via a TCP establishment (e.g., SYN, SYN-ACK, and ACK messages) protocol between the TCP stack on the terminal nodes and a TCP stack on the YouTube server. Once the video feed data are received, the YouTube app may ask for thumbnail images from a YouTube image server for the videos listed in the feed data using multiple simultaneous HTTP GET requests. The YouTube image server provides the requested thumbnail images in HTTP responses. Each thumbnail request/response is carried on its own separate TCP connection.

For each video in the video feeds and search results, multiple uniform resource locators (URL) for different formats of the video are provided. The YouTube app decides which format to use based on its capabilities and user configurations and preferences. The YouTube app sends an HTTP GET request to the server with the URL of the video in the selected format. The YouTube server sends back the requested video in an HTTP response. The HTTP response is segmented into many IP packets. The first IP packet of the HTTP response carries the HTTP response status code (200=OK). An example of HTTP response headers is shown below.

```
HTTP/1.1 200 OK
Last-Modified: Sat, 11 Feb 2012 08:29:46 GMT
Content-Type: video/mp4
Date: Tue, 28 Feb 2012 00:31:10 GMT
Expires: Wed, 29 Feb 2012 00:31:10 GMT
Cache-Control: public, max-age=86400
Accept-Ranges: bytes
Content-Length: 56924607
X-User-Agent-Options: no-save
Connection: close
X-Content-Type-Options: nosniff
Server: gvs 1.0
```

In the example above, the HTTP response header "Content-Type" indicates that MP4 format video is included in the response. The HTTP response header "Content-Length" indicates that the length of the MP4 video included in the HTTP response is about 57 MB.

Figure 6:
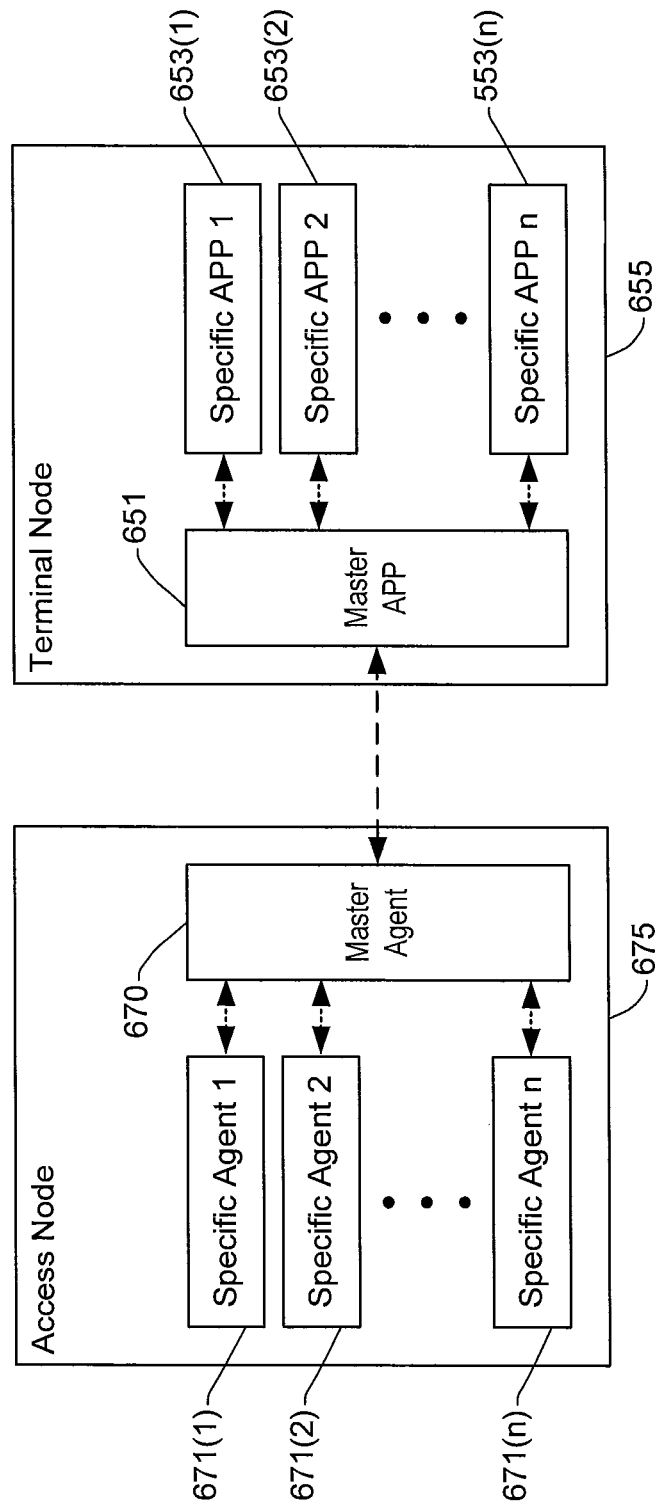
FIG. 6 is a block diagram of application agents and applications in accordance with aspects of the invention.

FIG. 6 is a block diagram of application agents and applications in accordance with aspects of the invention. The application agents are associated with an access node 675; the applications are associated with a terminal node 655. Applications in the terminal node 655 cooperatively operate with application agents in the access node 675. The application agents and applications may be used, for example, in the communication system of FIG. 4. The access node 675 of FIG. 6 may in various embodiments be similar to or the same as the access node 475 of FIG. 4; the terminal node 655 of FIG. 6 may in various embodiments be similar to or the same as the terminal node 455 of FIG. 4.

The access node 675 includes a master application agent 670. The master application agent 670 communicates with a master application 651 in the terminal node 655. In an embodiment, the master application 651 is part of an operating system of the terminal node 455. The master application agent 670 and the master application 651 facilitate communications between specific application agents 671(1)-671(n) in the access node 675 and specific applications 653(1)-653(n) in the terminal node 655.

The master application agent 670 and the master application 651 may facilitate communications between all the specific application agents 671 and the specific applications using a single TCP connection. An IP path, in an embodiment, is established between the master application 651 and the master application agent 670.

The master application 651 and the master application agent 670 can be aware of the IP address of its peer, which may or may not be the same as the IP address of the associated access or terminal node, by various techniques. For instance, the access node may establish or discover a terminal node's IP address when the terminal node enters the network. In many embodiments, there are multiple concurrently operating terminal nodes and the master application agent 670 accordingly is aware of multiple peer node addresses. Address resolution protocol (ARP) may be used when a suitable, underlying Layer 2 address is available (e.g., an Ethernet MAC address) on which the ARP function may be based. Alternatively, the master application agent 670 may assign addresses to the master application 651 using a dynamic assignment technique, for example, dynamic host configuration protocol (DHCP). Alternatively, the IP path information may be programmed into the master application 651 and the master application agent 670, for example, by an operator via a management connection. In another alternative, the access node 675 advertises the IP address of the master application agent 670. The IP address may be advertised as an augmentation of a control channel already in place for controlling the RAN (e.g., use a RAN control path). For example, the access node 675 may include the address in a network entry response to terminal nodes when they join the network or broadcast the address on a broadcast control channel (e.g., an LTE System Information Block (SIB) channel).

The IP address may not need to be routable outside the network defined by an access node and associated terminal nodes. Thus, various well-known, non-routable IP addresses may be used. The assignment of non-routable IP addresses in an LTE network may be based on an eNodeB physical cell identity (PCI). For example, the IP address of a master application agent in an eNodeB may be assigned a base address of 172.16.0.0 plus a 9-bit offset (of the 9 least-significant bits) corresponding to its 9-bit PCI value. The master application agent in an eNodeB with a PCI value of 255 would be assigned IP address of 172.16.0.255. As the eNodeB PCI is broadcast to all UEs within the eNodeB's serving range, the master application agent IP address would be calculable by a UE without RAN signaling overhead. This technique could also be applied to IPv6 addressing.

Similarly, the IP address of a master application in an LTE user equipment may also be a non-routable address. The non-routable address may be formed from a combination of a base address (using IPv4 or IPv6) plus an offset. The offset may be based, for example, on a default radio bearer identifier or Temporary Mobile Subscribe Identity (M-TMSI). As the addressing scheme can be known by the master application agent, the IP address of the master application can be known without RAN signaling overhead.

Alternatively, the IP datagrams sent as part of APP-agent cooperative communications may use a combination of all-zero (0.0.0.0) source addresses and broadcast or multicast destination addresses. In an embodiment, communication from the master application agent 670 to the master application 651 may use an IP source address of 0.0.0.0 and a broadcast destination address of 255.255.255.255. Alternatively, a multicast address, between the range of 224.0.0.0 and 239.255.255.255 may be used as the destination address. In an embodiment, the multicast or broadcast destination address may be replaced by the appropriate unicast IP address, once assigned and discovered using the techniques described above. Similar methods and addresses may be used for the specific application agents 671 and the specific applications 653. The IPv4 addressing methods described above may be extended to work within an IPv6 network.

In an embodiment, communication between the master application 651 and the master application agent 670 is over a control communication channel specific to the radio access technology (RAT). The communications may use, for example, individual or broadcast messages. To facilitate new specific applications, RAT specific messages that provide a container for application specific messages may be used. For example, in an LTE network, referencing to FIG. 5, one or more signaling radio bearers (SRBs) may be used to carry messages to and from the application 551 and the application agent 570. In an embodiment, messages may be carried on one or more existing SRBs as defined by the third generation partnership program (3GPP) standard. Alternatively, messages may be carried on one or more SRBs established for the purpose of carrying messages between an application and an application agent. In such a scenario, the packet inspection module 529 in the access node 575 may intercept, process, and respond to APP-agent cooperative communications messages sent on an SRB between the terminal node 555 and the access node 575 rather than forwarding the messages to the MME as defined by the 3GPP standards.

In an alternative embodiment, APP-agent cooperative communications may use an existing or dedicated user data plane communication channel established for the purpose of communicating application data traffic between the access node 575 and the terminal node 555. In this case, APP-agent cooperative communications on the logical APP-agent cooperative communication control path 503 and user data traffic on the logical application data path 501 may reside on the same user data plane communication channel. For example, in an LTE network, APP-agent cooperative communications may be carried on an existing default data radio bearer (DRB) or dedicated DRB and indicated or marked for consumption at the access node rather than forwarding to the core network. Alternatively, a new dedicated DRB may be created for the purpose of carrying APP-agent cooperative communications. Additionally, APP-agent cooperative communications may be carried on multiple DRBs or a combination of one or more SRBs and one or more DRBs. For example, different bearers may be associated with different specific applications or groups of specific applications.

In an embodiment, a DRB dedicated to the purpose of carrying APP-agent cooperative communications may be created without using signaling between the terminal node 555 and the core network. For example, in an LTE network, a DRB dedicated to the purpose of carrying APP-agent cooperative communications may be created without involvement of the Mobility Management Entity (MME) located in the core network thereby reducing signaling and improving the efficiency of the network. In such a scenario, the packet inspect module 529 in the access node 575 may intercept, process, and respond to APP-agent cooperative communications messages sent between the terminal node 555 and the access node 575 rather than forwarding the messages to the MME or S-GW as defined by the 3GPP standards for signaling messages and data traffic, respectively.

The master application agent 670 and the master application 651 may also process APP-agent cooperative communications. For example, the master application agent 670 or the master application 651 may coordinate, combine, or otherwise manipulate information communicated between the specific application agents 671 and the specific applications 653.

The master application 651 may process APP-agent cooperative communication so that the specific applications 653 do not need to be aware of or involved in APP-agent cooperative communications. This can allow pre-existing specific applications to benefit from APP-agent cooperative communications without modification.

In an embodiment, the master application 651 may intercept streaming video communications between an application on a terminal node and a server application and filter available video representations based on limitations of system capacity. For instance, consider the YouTube streaming video example described above. A streaming video may be available in multiple formats and representations each with an associated data rate. For example, the YouTube server may use a progressive download format allowing the YouTube application (an example of a specific application 653) to select a playback file from among a set of files, each having a different bit rate, via an HTTP GET command. The list of available formats and bit rates is conveyed via a list of URLs (one per playback file) and is normally sent from the YouTube server to the YouTube application. The list may be intercepted by the master application 651 and filtered based upon the limitations of available capacity before being passed to the YouTube application.

The filtering may take several forms. In an embodiment, the list of available formats intercepted by the master application 651 is sent via APP-agent cooperative communications to the master application agent 670 or one of the specific application agents 671. The formats may be filtered by the master application agent 670 or the specific application agent 671. The filtering may be after consultation with a resource control module (e.g., the resource control module 480 of FIG. 4). For example, during periods of congestion, the resource control module may provide an admission control response that limits all video streaming to bit rates less than 1 Mbps. The master application agent 670 or the specific application agent 671 uses this information to delete all streaming options (e.g., URLs) with bit rates greater than 1 Mbps from the list of available formats before sending the filtered list back to the master application. In an alternative embodiment, the master application agent 670 may provide periodic updates to the master application 651 via APP-agent cooperative communications describing the current limits for streaming video bit rates. The master application 651 in turn uses this information to locally filter the bit rate options before sending them to the YouTube specific app. The above techniques may be applied to any video playback technology involving multi-bitrate streams, such as dynamic adaptive streaming over HTTP (DASH), Microsoft's smooth streaming, Apple's live streaming, and Adobe's dynamic streaming.

Information or requests that may be common to multiple different applications may be aggregated. For example, the master application agent 670 can provide the master application 651 with current congestion and excess resource headroom. The master application 651 can then supply congestion and resource headroom information to the specific applications 653.

Additionally, common queries, for example, whether a particular application class (e.g., voice, video) at a particular data rate can be supported with a desired level of QoS, may be uniformly implemented in a single master application-master application agent pair rather than in each specific application and specific application agent. Admission control responses, such as those which terminate or modify a service, may additionally be implemented in the master application 651 and the master application agent 670.

In addition to supporting common application-generated cooperative communications, the master application 651 and the master application agent 670 may pass through any additional APP-agent cooperative communication. That is, cooperative communications specific to a particular pair of the specific applications 653 and specific application agents 671 can pass through the master application 651 and the master application agent 670. For example, cooperative communications about a video client playback buffer status may pass from one of the specific applications 653 through the master application 651 and the master application agent 670 to one of the specific application agents 671.

Use of a master application agent or master application can reduce signaling overhead and reduce burdens on application developers. This can also reduce the complexity of interfacing the application agent(s) 671 with other functions in the access node 675, such as a resource control module.

Many variations on the application agents and applications shown in FIG. 6 are possible. For example, a master application may directly communicate with specific application agents in an access node that does not include a master application agent. Similarly, a master application agent may directly communicate with specific applications in a terminal node that does not include a master application. Additionally, an access node may have a master application agent as well as one or more application agents that directly communicate with specific applications, and a terminal node may have a master application as well as one or more applications that directly communicate with specific application agents. Furthermore, the above addressing schemes (or variants thereof) can also be used in the absence of a master application agent or master application.

The presence or absence of a master application agent in an access node may be signaled using a data field or bit within an existing broadcast control channel, for example, in an LTE SIB or MIB message. The data field or bit may use an existing but unused location in a message. Alternatively, a new field in an existing SIB message or an entirely new SIB may be created for the purpose of indicating the presence of a master application agent.

In an embodiment, access node 675 communicates the presence or absence of the master application agent 670 via communication to an element in the core network which subsequently informs the terminal node 655. For example, in an LTE network, an eNB may send a message indicating the existence or absence of a master application agent on the eNB to the MME server located in EPC core network using the 3GPP defined S1 communication channel. The 3GPP S1-Setup/eNodeB Configuration Update may be enhanced to indicate application agent support by use of an ASN.1 extension marker and a new field using type-length-value (TLV) format. Upon receipt of the S1 message, the MME may send the presence or absence information to the UE via a 3GPP NAS message. Many other signaling methods may also be used.

The terminal node 655, in an embodiment, may signal the presence or absence of a master application 651 via communication to an element in the core network. For instance, an LTE UE may signal the presence of a master application 651 via a NAS message sent to the MME. For example, the UE specific S1-Initial Context Setup/E-RAB Setup/Modify message may be modified to include presence information as an optional element in TLV format. Following receipt by the MME, the MME then communicates the information with the appropriate eNB.

In an embodiment, the access node 675 may communicate the presence or absence of a master application agent 670 by adding a presence bit to the packet headers of a layer of the RAN protocol stack (e.g., the packet formats defined for packet data convergence layer, radio link control layer or medium access control layer illustrated in FIG. 5). A similar technique may be used by the terminal node 655 to indicate the presence of a master application 651 to the access node 675.

APP-agent cooperative communications can be used in many ways. The following paragraphs describe examples of APP-agent cooperative communications. Many examples are described for specific applications and specific network technologies, but it should be understood that the examples and variations thereof are widely applicable to other applications and other network technologies. Similarly, many of the examples are described for APP-agent cooperative communications between an application agent in an access node and an application in a terminal node but it should be understood that the examples and variations thereof are widely applicable to other devices.

APP-agent cooperative communications may be used to adapt video communications for changing communications network conditions, for example, RAN conditions. In real-time video streaming protocols, for example, an application agent can inform the associated real-time streaming video application when the communication system has more or fewer resources available. The application agent may, for example, inform the application about the network conditions by communicating resource availability or by communicating new preferred or maximum data rates or resolutions for the video. When requesting the next block or segment of video, the application can request a segment with a different average or peak bit rate or different resolution in order to adapt the video to the change in resources.

In an embodiment, an application agent may inform one or more video applications about estimated future resource availability. The estimate of future resource availability may be communicated as a single number (e.g., 2 Mbps) across a defined period (e.g., the next two seconds). Alternatively, a multi-point estimate may be used to depict the relationship between future capacity and time across a longer horizon. An example multi-point estimate is shown in the table below. The second column in the table states estimated capacities at times given in the first column.

| Time (seconds) | Estimated Future Capacity (Mbps) |
| --- | --- |
| 0 | 2.0 |
| 1 | 1.5 |
| 2 | 1.0 |
| 3 | 0.5 |
| 4 | 2.5 |
| 5 | 3.5 |

A video application may use the estimated future capacity to select a next video segment so the bit rate is at or below the estimated future bit rate capacity for the segment duration. For example, consider a video stream which has 2-second segments available at 3 different bit rates: 0.7 Mbps, 1.3 Mbps, and 2.5 Mbps. If the video application is informed that the estimated future bit rate will be reduced from 1.5 Mbps to 1.0 Mbps, then the application which had been fetching 1.3 Mbps segments may select a 0.7 Mbps segment at the next opportunity.

A video application may use the estimated future bit rate to justify a bit rate larger than the current capacity when it is expected that future capacity may be suitably larger and that the current local buffer occupancy is sufficient to ensure stall-free operation (e.g., the local buffer will not empty) until the larger capacity is made available. For example, consider a video application that is fetching 2.0 Mbps segments and has 10 seconds of video stored in its local buffer. The application then receives the estimated future capacity shown in the example table above, which predicts that capacity will drop from the current (time=0) value of 2.0 Mbps to a minimum of 0.5 Mbps at a time 3 seconds into the future after which the capacity will quickly recover and surpass the current value. If the period of time for which there is a capacity shortfall (i.e., the estimated capacity is less than the current segment bit rate) is shorter than amount of video locally buffered, the application may continue to fetch segments with a bit rate larger than the current capacity. In the example above, the capacity shortfall begins at time t=1 second and ends at t=4 seconds and is therefore 3 seconds. As the local buffer occupancy is 10 seconds, the video application may continue fetching 2.0 Mbps segments.

Conversely, an estimation that future resources may be contracting can be used by a video application to reduce the bit rate for the next segment of video in advance of the reduction, thereby increasing client buffer occupancy and reducing the impact (e.g., playback stalls) of the upcoming reduction.

Various methods may be used to estimate future resource availability. For example, a history of resource availability may be stored in a resource estimation module. A correlation of resource availability to time of day, day of week, and other events may allow an application agent to predict whether future resources will be larger or smaller than current resources. For example, an LTE eNB serving a major interstate freeway may see peak demand during morning and evening weekday commute periods. Based on historical data, an application agent may, for example, predict that per user resources will drop at an average rate of 2% per minute over the next 30 minutes as commute traffic builds.

Additionally, resource availability between a particular terminal node and an access node may be estimated based on a repeating pattern of time-varying channel conditions. For example, the resource estimation module 481 in the access node 475 may track the DL and UL modulation and coding scheme (MCS) of a particular terminal and determine that a repeating pattern exists. For example, the channel conditions (and hence available capacity) of a user may shift from excellent to poor and back to excellent over a 5 minute period each day around 5 p.m. Such a pattern may be due to an office worker leaving their desk and walking to their car. In an embodiment, an access node may determine that a user is once again in the midst of such a pattern using knowledge such as time of day and matching recent channel history (e.g., last one minute) with historical (e.g., established over 5 minute periods) channel patterns. Once a pattern has been detected, future capacity may be estimated by projecting ahead from the current position in the detected historical pattern.

Estimation of future resource availability may also be made via extrapolation. For example, a linear regression of recent capacity (both per terminal node and for an entire access node) may be used to predict capacity in the near future. Other forms of historical curve fitting (e.g., polynomial, exponential) may also be used for extrapolating resource availability.

APP-agent cooperative communications may be used to adjust scheduling of communications from an access node.

A device that uses application-aware scheduling can obtain information about the application from the APP-agent cooperative communications. The information about the application obtained via APP-agent cooperative communications might otherwise be difficult or impossible to obtain. The APP-agent cooperative communications may reduce or eliminate the need for application detection and application information detection for cooperative applications. For example, a device that can perform application detection and application information detection as described in U.S. patent application Ser. No. 13/607,559, filed Sep. 7, 2012 and titled "Systems and Methods for Congestion Detection for use in Prioritizing and Scheduling Packets in a Communication Network" can perform less detection when communicating with applications that provide APP-agent cooperative communications. The cooperation may also provide more accurate information about the state of an application. For a video session, for example, the APP-agent cooperative communications can communicate whether a video is in an initial buffering state, a playback/viewing state, a paused state, a stopped state, a rewind state, or a fast forward state. The access node can use the video state in scheduling and admission control decisions.

Low initial buffering time (the duration of the buffering period between initial data request and when playback can begin) is important to user QoE during playback of streaming video. In an embodiment, scheduling resources applied to a streaming video session by an access node may be increased temporarily to reduce the initial buffering time. This may be effected by increasing an AF for the streaming video session during the initial buffering period. Information about the initial buffering period may be communicated to the access node via APP-agent cooperative communications. Information about the initial buffering period may include, for example, that the terminal node has a video in the initial buffering period and the number of bytes that must be received before beginning playback ("remaining bytes"). The scheduling resources may be increased until transmission of the remaining bytes is completed. Additionally, an admission control request made by a new user may be deferred until the initial buffering periods of one or more video sessions for one or more existing users have been completed. An access node may calculate the completion time of an initial buffering period by dividing the remaining bytes by the current or predicted resources (e.g., expressed in bytes per second) allocated to the video stream.

The APP-agent cooperative communications can communicate playback buffer status, local video buffer occupancy, and freeze indications from the video client application. Scheduler parameters in the access node can be adjusted accordingly. In an embodiment, the communications resources allocated to a video session by an access node may be based on the current buffer occupancy as communicated via APP-agent cooperative communications from a terminal node. For example, consider a terminal node that reports a low buffer occupancy and is at risk of stalling. In such a case, the access node may increase resources allocated to the video session by increasing the AF or the scheduling priority for associated packets. Conversely, consider a terminal node that reports a high buffer occupancy. For this video session, scheduling resources may be decreased via a decrease of AF or scheduling priority thereby freeing resources for other sessions.

APP-agent cooperative communications may be used in admission control decisions. The APP-agent cooperative communications can be used to create a more accurate picture of resource demand for application-aware admission control systems. For example, a cooperative application on a terminal node such as a streaming video client may report the average bit rate and duration of a streaming video session using APP-agent cooperative communication. Such information may be used by an access node in calculating current and future resource demand. By subtracting resource demand from the access node capacity, a measure of the available excess capacity is created which may be applied to new services requesting admission.

The APP-agent cooperative communications can be used to provide increased options for admitting a modified version of a session or provide increased options for modifying other sessions to allow a new session. For example, a cooperative application on a terminal node may communicate a set of bit rate options available for a video clip by using APP-agent cooperative communication (e.g., a list of rendering bit rates transmitted by a "Dynamic Adaptive Streaming over HTTP" or DASH server to a DASH application during session initialization). Based upon the available excess capacity, the access node may eliminate or forbid the use of one or more of the higher bit rate options in the list. The reduced list may be communicated back to the terminal node providing the application with a reduced set of bit rate options. This allows for reliable video playback within the constraints of the access node's available capacity. Additionally or alternatively, in networks with multiple terminal nodes, support of a new video session, such as the DASH session above, may include sending an updated bit rate list to one or more video sessions already in progress. For example, in order to support a new tenth DASH video session (the tenth session to be added with nine ongoing sessions), an access node may reduce the maximum bit rate available to the tenth session as well as send updated bit rate lists (with lower maximum bit rate options) to one or more of the ongoing nine sessions in order to free sufficient capacity to support the tenth session. During times of increasing excess capacity, the methods above may be reversed (i.e., expanding the bit rate list by increasing the maximum allowable bit rate) in order to improve user QoE. Additionally, in systems, such as LTE, where admission control is specified on a coarse, logical bearer basis rather than on a per session basis, APP-agent cooperative communications can be used to create finer grained admission control that responds with denials and modifications on a per session basis.

APP-agent cooperative communications may be used during handover. Information from the APP-agent cooperative communications can be used to optimize user quality of experience (QoE) during handover. For example, data buffered in an application may be increased prior to handover to avoid the buffer emptying during handover. When a handover is expected for a terminal node running a cooperative video application and the access node is aware, through APP-agent cooperative communication, that the video client playback buffer has additional capacity, scheduler parameters in the access node may be adjusted to increase the amount of video data buffered in the terminal node just prior to handover. Handover timing may also be controlled so that handover occurs during a convenient time for the application, that is, during a time that any interruption or delay in communication has less impact on QoE. For example, if handover is expected but not immediately necessary, handover may be initiated immediately when the application indicates to the application agent that the video has been paused. Similarly, an application agent may instruct applications communicating delay tolerant information, such as an email application or a browser application, to defer send or receive requests until after handover is complete. Handover improvement through APP-agent cooperative communications may improve efficiency for both the application and the communication network versus retransmitting data lost or damaged during handover.

APP-agent cooperative communications may be used to assess video quality. For example, the APP-agent cooperative communications can communicate information from RTP control protocol (RTCP) reports. RTCP reports contain information that allows assessing video quality. While an access node may be able to detect and extract information from RTCP reports (for example, using a packet inspection module), the same or similar information can be passed from an application to an application agent, reducing the computational resources needed in the access node. Availability of video quality information may be used to adjust scheduler parameters and resource allocations. For example, the access node may increase scheduler priorities for a video application to improve the quality if it is insufficient or may reallocate resource to other applications if the quality is above a threshold.

APP-agent cooperative communications may be used in scheduling acknowledgments. Information from the APP-agent cooperative communications may be used, for example, in scheduling TCP Acknowledgment (ACK) messages. Improved scheduling of TCP ACK messages on the uplink can avoid or rectify situations that may cause a stall or downlink data starvation for an application using TCP as one of its transport and connection protocols. The access node may use information about the timing of TCP ACK messages when the access node allocates uplink bandwidth to the terminal node. More precise timing of uplink bandwidth allocation for TCP ACK messages may be possible if a cooperative application provides information regarding the expected occurrences of TCP ACK messages. Communication bandwidth used for bandwidth allocation may also be reduced.

Additionally, robustness of modulation and coding schemes may be increased when TCP ACK messages are expected. Alternatively, a cooperative application may send a TCP ACK message after a timeout even though data was not received in order to prevent a stall or freeze. The timeout occurrences can be reported to the application agent, for example, for use in adjusting scheduler parameters to improve future performance. The application agent may report congestion conditions to the application allowing it to change its timeout threshold for sending a TCP ACK message after a timeout even though data was not received. Changing the threshold can occur, for instance, when the next segment of video can be requested at a lower rate to avoid future congestion and the likelihood of freezes is high for the remainder of the current video segment.

APP-agent cooperative communications may be used in service differentiation. Information from the APP-agent cooperative communications may be used, for example, to distinguish service scenarios that may otherwise be difficult or impossible to detect. A cooperative email application may, for example, indicate to the corresponding application agent what event triggered an email synchronization. When the email synchronization is triggered by a timeout or some other machine-generated stimulus, the access node may give a relatively low priority to scheduling the downlink data and corresponding uplink protocol, and when the email synchronization is triggered by a user action, the access node may give a relatively high priority to scheduling the downlink data and corresponding uplink protocol. In an embodiment, a low or high priority assignment may be established by applying a lesser or greater AF to the service in the scheduler, thereby increasing or decreasing the resources made available to the service. Thus, a higher priority is used when the user is waiting and a lower priority is used when no user is waiting. Accordingly, the APP-agent cooperative communications from a terminal node to an access node may include information about the stimulus of a communications request, for example, whether a user is waiting for requested data.

Similarly, an application may distinguish whether a user is specifically requesting to view a video (e.g., the user clicked on a video link) from a video coincidentally embedded in a webpage (e.g., the user chose a link to a news article that happens to have an embedded video). When the user chooses a video specifically, the QoE of the video is more important and a scheduler can adjust scheduler parameters accordingly based on information from APP-agent cooperative communications. In contrast, when the video is secondary, the scheduler can give more priority to the text of the story. Similar consideration may be used, for example, during severe congestion, to admission control decisions.

Furthermore, an application that combines multiple media in a session can signal the relative importance of the media to the application agent. A video calling application, for example, may deem the voice portion of the session to be more important than the video portion. If there are insufficient resources for both the voice portion and the video portion, the access node can use information about the relative importance received in APP-agent cooperative communications to preserve quality of the audio portion while the video portion is degraded or denied.

APP-agent cooperative communications may be used to avoid reduced QoE caused by traffic grooming. Traffic rates to and from a terminal node may be limited in multiple ways. When traffic rate limits are exceeded, traffic grooming may be triggered with some packets dropped or delayed. The traffic grooming may occur in a communication node that is not aware of the needs of the terminal node's applications. Such a communication node would thus delay or drop packets without regard to the effects on QoE. The APP-agent cooperative communications can be used by applications to avoid requesting excessive data that could trigger grooming. By not triggering grooming, the QoE may be improved. Other capabilities for communication can be similarly signaled to a terminal node, and the terminal node can adjust its requests accordingly.

An example rate limit is the aggregate maximum bit rate (AMBR) that an LTE system applies to a terminal node (user equipment in LTE nomenclature). The AMBR governs bandwidth resources that may be allocated to the terminal nodes, even if excess system resources exist. The LTE packet gateway is often provisioned to groom the data going to the terminal node, delaying or discarding packets, to ensure the average data rate is no more than the AMBR.

Traffic rates for a terminal node may also be limited contractually by a service level agreement (SLA). SLA limits may apply at various levels, for example, the terminal node, a logical link, a bearer, or a connection.

The terminal node may have limited or no knowledge of its rate limits. For example, the terminal may know its AMBR but not the SLA limits. Individual applications generally do not know the rate limits. Furthermore, the individual application would not know which other applications are active or the resource demands of the other applications relative to the rate limits. For example, a video application may not know whether a particular video resolution will cause a rate limit to be exceeded, and thus trigger delays and discards of packets for all the applications on the terminal node.

In an embodiment, a master application or master application agent, for example, as shown in FIG. 6, may keep track of cumulative application resource requests and track the cumulative resources versus rate limits. Other modules, for example, a part of the terminal node's operating system or a part of the RAN protocol stack (e.g., radio resource control (RRC) or radio resource management (RRM) for LTE), may keep track of cumulative application resource requests for use by applications. A cooperative application may communicate with the master application, the master application agent, or another module to determine the remaining data rate available and use the rate information in guiding its requests for data. In various embodiments, the cumulative resource requests may be tracked in the access node or the terminal node. The mechanism by which applications determine the resource allocation and rate limit information varies according to where the information is available. For example, an application may communicate with an application agent that communicates with module in the RAN protocol stack that keeps track of resource utilization and rate limits for the terminal node and its collection of active applications.

APP-agent cooperative communications may be used for analyzing the performance of a communications network. Information related to performance can be collected from APP-agent cooperative communications. For example, when an application communicates information about video stalls, audio stalls, or buffer under-runs, the information can be used to analyze the performance of the terminal node, the access node, and other area of the communication system. The application may additionally communicate the number and duration of playback stalls or a chronology of playback, start and stop times of each video or audio session. The application may communicate an estimate of video or audio playback quality, for example, in the form of a mean opinion score (MOS). Additionally, the application may communicate packet-level quality of service (QoS) metrics, for example, packet delay and jitter, measured at the terminal node. The application may also report user-level (human) actions that may signal severe dissatisfaction with network performance, for example, one or more browser or application refreshes, duplicate 'clicks' or 'touches' on the same link or command, or user shutdown of an application following a period of poor network quality or poor application responsiveness. The various information can be used to determine a level of congestion that is acceptable for different applications or different mixes of applications. The information can also be used by the operator to determine when to add more resources to a network.

It is clear from these examples that APP-agent cooperative communications can be used for many different types of information, used with many different types of applications, and used to improve many different aspect of a communication network.

Figure 7:
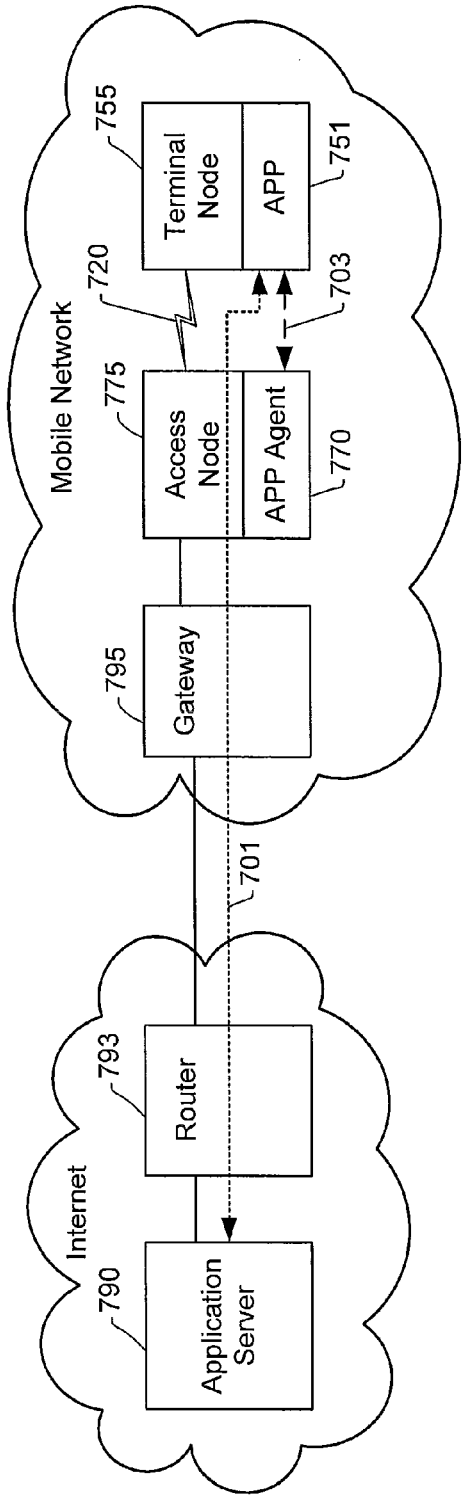
FIG. 7 is a block diagram of a communication system with application agents and applications in accordance with aspects of the invention.

FIG. 7 is a block diagram of a communication system with application agents and applications in accordance with aspects of the invention. A terminal node 755 hosts an application 751. The application 751 may communicate with an application server 790 to facilitate providing services to a user of the terminal node 755. Various elements of the communication system may the same or similar to like named elements described above.

The terminal node 755 in the communication system shown in FIG. 7 communicates with an access node 775 over a radio link 720. The access node 775 is connected to a gateway node 795. The gateway node 795 provides access to the Internet via connectivity to a router node 793. The router node 793 provides access to the application server 790. Thus, the application 751 can communicate with the application server 790 using an application data path 701 through the access node 775, the gateway node 795, and the router node 793. The application data path 701 transports application user data (e.g., video data) and application control data (e.g., information regarding possible videos available and their formats). The access node 775 acts as a bridge for communications on the application data path 701, passing it between the terminal node 755 and the next node in the communication system.

The application 751 also communicates with an application agent 770 in the access node 775 using an APP-agent cooperative communication control path 703. The APP-agent cooperative communication control path 703 is transmitted over the radio link 720. Communications on the APP-agent cooperative communication control path 703 between the application 751 and the application agent 770 may be used, for example, for improving scheduling, admission control, efficiency, and responsiveness.

Figure 8:
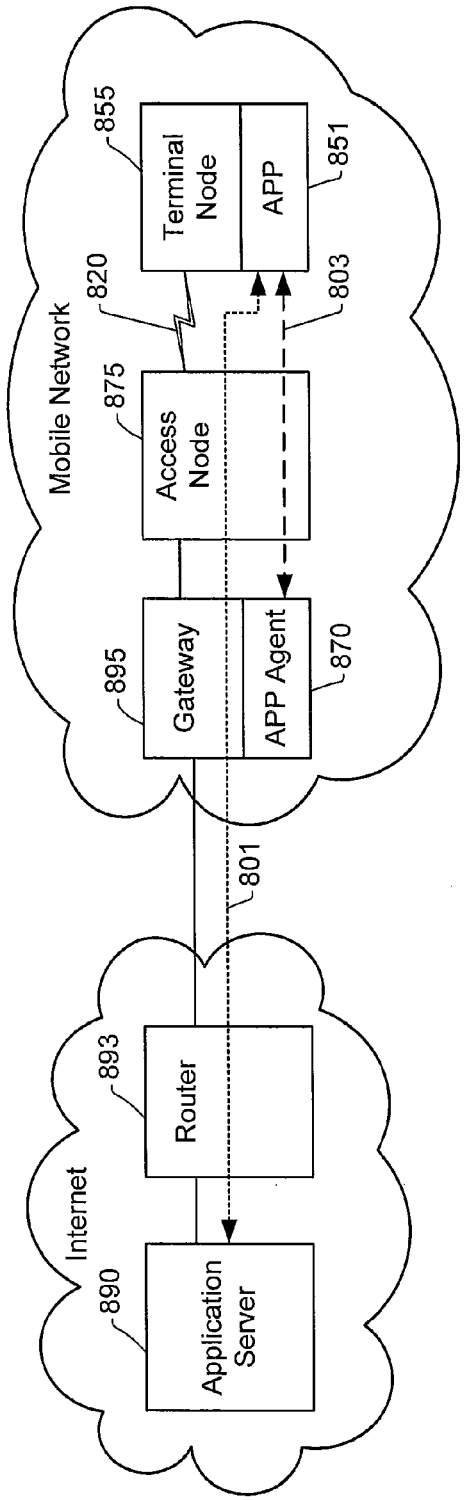
FIG. 8 is a block diagram of another communication system with application agents and applications in accordance with aspects of the invention.

FIG. 8 is a block diagram of another communication system with application agents and applications in accordance with aspects of the invention. The communication system of FIG. 8 is similar to the communication system of FIG. 7 and includes a terminal node 855, an access node 875, a gateway node 895, a router node 893, and an application server 890 that correspond to like-named devices in the communication system of FIG. 7. The terminal node 855 communicates with the access node 875 over a radio link 820. The access node 875 is connected to the gateway node 895. The gateway node 895 provides access to the Internet via connectivity to the router node 893. The router node 893 provides access to the application server 890.

An application 851 in the terminal node 855 can communicate with the application server 890 using application data path 801 through the access node 875, the gateway node 895, and the router node 893. The application 851 also communicates with an application agent 870 using an APP-agent cooperative communication control path 803. In the communication system of FIG. 8, the application agent 870 is in the gateway node 895. Information from the application agent 870 may be provided to the access node 875. The APP-agent cooperative information may be supplied, for example, to scheduler and resource control modules in the access node 875. The access node 875 can use the APP-agent cooperative information, for example, for improving scheduling, admission control, efficiency, and responsiveness.

In another embodiment, an application agent may be located in the router node 893 or in another network node. The functions of an application agent may also be distributed over multiple devices.

Additionally, if the APP-agent cooperative communication control path 803 is via an IP path, the path may be through additional communication nodes. For example, cooperative communications may be routed through the router node 893. Locating the application agent outside the access node 875 may eliminate or reduce uplink packet inspection requirements in the access node 875. A remotely located application agent may also perform function for multiple access nodes.

Figure 9:
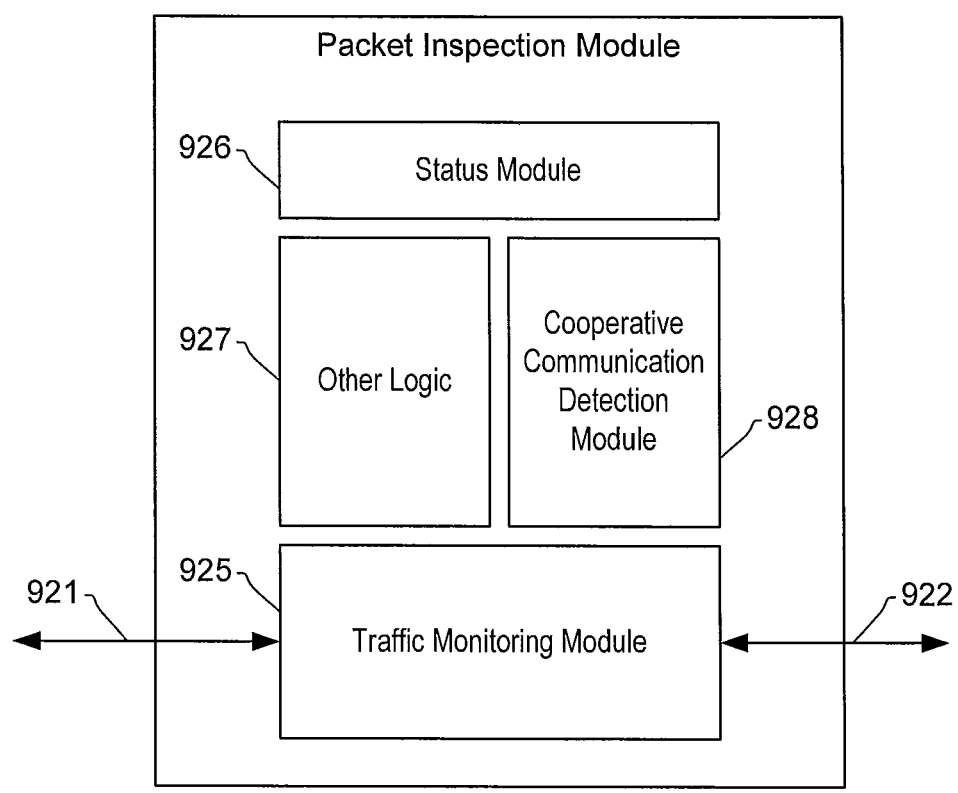
FIG. 9 is a block diagram of a packet inspection module in accordance with aspects of the invention.

FIG. 9 is a block diagram of a packet inspection module in accordance with aspects of the invention. The packet inspection module 429 of the access node 475 of FIG. 4 may be, for example, provided by the packet inspection module of FIG. 9. The packet inspection module, in an embodiment, is included in the terminal node 455 of FIG. 4 to detect and determine the disposition of DL APP-agent cooperative communications messages. The packet inspection module may, for example, determine that a message should be ignored or that a message should be sent a master application or one or more specific applications. The packet inspection module may be used in a data path between a RAN protocol stack and other entities, such as application servers, residing in a core network or the Internet.

Uplink data may come to the packet inspection module via a first path 921 (e.g., on a radio link) and be forwarded from the packet inspection module via a second path 922 (e.g., on a backhaul connection). Downlink data may come to the packet inspection module via the second path 922 and be forwarded from the packet inspection module via the first path 921.

The packet inspection module includes a traffic monitoring module 925 that may monitor traffic on the first path 921 and the second path 922. The traffic monitoring module 925 identifies APP-agent cooperative communications from an application destined for an application agent. In particular, the traffic monitoring module 925 may monitor the uplink traffic on the first path 921 to identify APP-agent cooperative communications. The APP-agent cooperative communications may be identified using, for example, IP addresses. For example, the traffic monitoring module 925 and the cooperative communication detection module 928 may use packet inspection to identify APP-agent cooperative communications by detecting those UL packets that contain a multicast or broadcast source or destination address assigned for APP-agent cooperative communications. This detection can be used with the multicast or broadcast methods described above.

The packet inspection module, alternatively or additionally, may identify APP-agent cooperative communications through detection of one or more unique TCP/UDP source or destination port numbers that are not used by other traffic or are specifically assigned for APP-agent cooperative communications. This technique may be applied on both UL and DL APP-agent cooperative communications. A single unique port number may be used to identify the source or destination of cooperative communications between a single specific application and specific application agent, a group of specific applications and a group of specific application agents, and various combinations.

In an embodiment, the traffic monitoring module 925 is provided by the packet inspection module 529 in the access node 575 of FIG. 5 and may detect UL APP-agent cooperative communications by detecting use of a unique IP datagram protocol type (e.g., set by the transport and connection protocols module 550' in the terminal node 555). For example, the protocol type may be set to an unassigned value (e.g., a number between 143 and 252). Similar methods may be used to detect DL APP-agent cooperative communications.

In various embodiments, various combinations of IP address, source port, destination port, and protocol type are used to create unique connections for the purpose of UL and DL APP-agent cooperative communications.

The traffic monitoring module 925 may also monitor traffic at the packet inspection module for other purposes, and the packet inspection module may include an other logic module 927 to address the other purposes. The packet inspection module may also detect information about applications associated with the traffic on the first and second paths. Further examples of packet inspection, traffic monitoring, and application-aware communication systems may be found in U.S. patent application Ser. No. 13/549,106, filed Jul. 13, 2012 and titled "Systems and Methods for Detection for Prioritizing and Scheduling Packets in a Communication Network," U.S. provisional application Ser. No. 61/640,984, filed May 1, 2012 and titled "Application Aware Admission Control," and U.S. patent application Ser. No. 13/644,650, filed Oct. 4, 2012 and titled "Congestion Induced Video Scaling," which are hereby incorporated by reference.

The other logic module 927 may track the IP addresses, port numbers, and protocol types, used for application data traffic. For example, in the communication network of FIG. 5, the other logic module 927 may track IP addresses, port numbers, and protocol types on the application data path 501. The other logic module 927 may detect conflicts between the IP addresses, port numbers, and protocol types used for APP-agent cooperative communications and the IP addresses, port numbers, and protocol types used for application data traffic. In the event that the combination of IP addresses, port numbers, and protocol types used by APP-agent cooperative communications is the same as the combination used by application data traffic, the other logic module 927 may select a new, unused combination and communicate this new combination to the affected terminal nodes. The new combination may be selected from a list provided by the network operator.

APP-agent cooperative communication traffic is diverted to a cooperative communication detection module 928. The APP-agent cooperative communication traffic may be diverted by the traffic monitoring module 925. The cooperative communication detection module 928 provides further processing on the APP-agent cooperative communication traffic. An example of the further processing is forwarding the traffic to an appropriate application agent. The further processing may also include no processing, for example, when the cooperative communication detection module 928 determines that the traffic forwarded to it is not for an application agent associated with the packet inspection module.

The packet inspection module, as illustrated in FIG. 9, may include a status module 926. The status module 926 may keep track of information regarding instances of connectivity between applications and application agents. The information may include, for example, status (e.g., connected, disconnected, active, idle), current resource expectations, and historical data (e.g., resources requested versus resources used).

The foregoing systems and methods and associated devices and modules are susceptible to many variations. Additionally, for clarity and concision, many descriptions of the systems and methods have been simplified. For example, the figures generally illustrate one of each type of device (e.g., one access node, one terminal node), but a communication system may have many of each type of device. Similarly, many descriptions use terminology and structures of a specific wireless standard such as LTE. However, the disclosed systems and methods are more broadly applicable, including for example, in hybrid fiber-coax cable modem systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An access node, comprising:
a transceiver configured to communicate with a terminal node;
a processor coupled to the transceiver and configured to establish a radio access network (RAN) control path, an application data path, and an APP-agent cooperative communication control path between an application agent in the access node and an application in the terminal node, wherein the application is a video application that requests video data in a sequence of segments, the video data being available in multiple formats and wherein the APP-agent cooperative communication control path is different from the RAN control path and the application data path,
receive from the terminal node information about the video application at the terminal node over the APP-agent cooperative communication control path, wherein the information about the video application is used to improve quality of experience for users of the terminal node and includes estimated future capacity and occupancy of a video buffer at the terminal node used to playback the video data,
receive, over the application data path, a request from the video application in the terminal node for application data from an application server,
transmit, over the application data path, the request from the video application in the terminal node for the application data to the application server,
receive, over the application data path, the application data from the application server in response to the request from the video application in the terminal node for the application data, and
transmit, over the application data path, the application data received from the application server to the terminal node with characteristics that utilize the information about the video application; and
a backhaul interface coupled to the processor and configured to provide communications with the application server.

2. The access node of claim 1, wherein the APP-agent cooperative communication control path uses at least one long term evolution (LTE) radio access network (RAN) bearer.

3. The access node of claim 2, wherein the APP-agent cooperative communication control path uses a plurality of RAN bearers.

4. The access node of claim 2, wherein the at least one LTE RAN bearer is a signaling radio bearer (SRB).

5. The access node of claim 2, wherein the at least one LTE RAN bearer is a data radio bearer (DRB).

6. The access node of claim 2, wherein the APP-agent cooperative communication control path uses the at least one or more LTE RAN bearers that are dedicated to APP-agent cooperative communications.

7. The access node of claim 2 wherein the APP-agent cooperative communication control path is not communicated via a core network node.

8. The access node of claim 1, wherein the APP-agent cooperative communication control path uses an user datagram protocol (UDP).

9. The access node of claim 1, wherein the APP-agent cooperative communication control path uses Internet protocol (IP) communications.

10. The access node of claim 9, wherein the processor is further configured to establish the APP-agent cooperative communication control path using broadcast or multicast IP addresses, discover one or more IP addresses associated with the video application, and continue the communications on the APP-agent cooperative communication control path using the discovered one or more IP addresses.

11. The access node of claim 9, wherein the processor is further configured to track IP addresses, port numbers, and protocol types used for application data traffic, detect a conflict between the IP addresses, port numbers, and protocol types used for application data traffic and IP addresses, port numbers, and protocol types used for the APP-agent cooperative communication control path using the IP communications, and
select a new combination of IP addresses, port numbers, and protocol types used for the APP-agent cooperative communication control path using the IP communications to resolve the detected conflict.

12. The access node of claim 1, wherein the information about the video application at the terminal node includes a streaming status of the video application, and wherein the processor is further configured to increase scheduling resources for packets associated with the video application when the streaming status is an initial buffering period.

13. The access node of claim 1, wherein the information about the video application at the terminal node includes a streaming status of the video application, and wherein the processor is further configured to defer an admission control request received when the streaming status is an initial buffering period.

14. The access node of claim 1, wherein the information about the video application at the terminal node includes a buffer occupancy of the video application, and wherein the processor is further configured to determine scheduling resources for packets associated with the video application based at least in part on the buffer occupancy.

15. An access node, comprising:
a transceiver configured to communicate with terminal nodes;
a processor coupled to the transceiver and configured to
establish APP-agent cooperative communication control paths between an application agent in the access node and applications in the terminal nodes and data paths between the access node and the terminal nodes, wherein each APP-agent cooperative communication control path connects one of the applications on a respective one of the terminal nodes to the application agent in the access node and wherein the applications are video applications that request video data in a sequence of segments, the video data being available in multiple formats,
transmit to the terminal nodes, over the APP-agent cooperative communication control paths, information about current capabilities and estimated future capabilities of the access node for communication via the data paths with the terminal nodes, wherein the information is used to improve quality of experience for users of the terminal nodes,
receive requests from the video applications in the terminal nodes for application data from one or more application servers,
transmit the requests from the video applications in the terminal nodes for the application data to the one or more application servers,
receive the application data from the one or more application servers in response to the requests from the video applications in the terminal nodes for the application data, and
transmit the application data received from the one or more application servers to the terminal nodes; and
a backhaul interface coupled to the processor and configured to provide communications with the one or more application servers.

16. The access node of claim 15, wherein the processor is further configured to transmit to the terminal nodes indications of whether the access node includes a master application agent to process information common to the video applications.

17. The access node of claim 16, wherein the indications of whether the access node includes the master application agent are transmitted to the terminal nodes using a communication selected from the group consisting of a field in a long term evolution (LTE) master information block (MIB), a field in an LTE system information block (SIB), a field in a broadcast message defined for master application agent indications, and a field in radio access network (RAN) protocol packet headers.

18. The access node of claim 16, wherein the indications of whether the access node includes the master application agent are transmitted to the terminal nodes via a core network node.

19. The access node of claim 15, wherein the information about the estimated future capabilities of the access node for the communication via the data paths with the terminal nodes includes estimated resource availabilities for a plurality of time intervals.

20. The access node of claim 15, wherein the information about the estimated future capabilities of the access node for the communication via the data paths with the terminal nodes is estimated using information selected from the group consisting of historical time-of-day resource availability, historical day-of-week resource availability, historical per-user patterns, and historical time-varying channel conditions.

21. The access node of claim 15, wherein the estimated future capabilities of the access node for the communication via the data paths with the terminal nodes is extrapolated from prior resource availability.

22. A terminal node, comprising:
a transceiver configured to communicate with an access node; and a processor coupled to the transceiver and configured to
establish a radio access network (RAN) control path between the access node and the terminal node, an APP-agent cooperative communication control path between an application agent in the access node, and an application in the terminal node and a data path between the access node and the terminal node, wherein the application is a video application that requests video data in a sequence of segments, the video data being available in multiple formats,
receive from the access node, over the APP-agent cooperative communication control path, information about current capabilities and estimated future capacity of the access node for communication via the data path with the terminal node, wherein the information is used to improve quality of experience for a user of the terminal node, and
wherein the video application requests a next segment of the video data from an application server via the access node in a format based on the estimated future capacity and occupancy of a video buffer at the terminal node used to playback the video data.

23. The terminal node of claim 22, further including a master application that receives a list of formats in which the video application can request video data, and wherein the master application filters the list of formats based on the information about the current capabilities and the estimated future capacity for the communication via the data path with the terminal node and supplies the filtered list to the video application.

24. The terminal node of claim 22, wherein the video data is available in multiple bit rates and wherein the video application requests the next segment of the video data in the format having a data rate at or below the estimated future capacity.

25. The terminal node of claim 22, wherein the video application requests the next segment of the video data in the format having a bit rate larger than the estimated future capacity of the access node when the occupancy of the video buffer is sufficient.

26. The terminal node of claim 22, wherein the processor is further configured to inspect received packets to detect packets containing the information about the current capabilities and the estimated future capacity of the access node for the communication via the data path with the terminal node.

27. The terminal node of claim 22, wherein the video application includes a master application and specific applications, and wherein the master application is configured to process information common to the specific applications.

28. The terminal node of claim 27, wherein at least one specific application of the specific applications is not aware of the terminal node receiving from the access node the information about the current capabilities and the estimated future capacity of the access node for the communication via the data path with the terminal node.

29. A terminal node, comprising:
a transceiver configured to communicate with an access node; and
a processor coupled to the transceiver and configured to
establish a radio access network (RAN) control path between the access node and the terminal node, an APP-agent cooperative communication control path between an application agent in the access node and an application at the terminal node, and an application data path between the terminal node and an application server, wherein the application is a video application that requests video data in a sequence of segments, the video data being available in multiple formats;
request communications, for the video application, from the application server via the access node, and
transmit, over the APP-agent cooperative communication control path, information about the video application to the access node, wherein the information about the video application includes estimated future capacity and occupancy of a video buffer at the terminal node used to playback the video data and is for use by the access node in communicating with the terminal node.

30. The terminal node of claim 29, wherein the video application includes a master application and specific applications, and wherein the master application is configured to process information common to the specific applications.

31. The terminal node of claim 30, wherein at least one specific application of the specific applications is not aware of the terminal node transmitting the processed information common to the at least one specific application of the specific applications to the access node.

32. The terminal node of claim 29, wherein the information about the video application includes an indication of whether the terminal node includes a master application.

33. The terminal node of claim 32, wherein the indication of whether the terminal node includes the master application is transmitted to the access node using a field in a radio access network (RAN) protocol packet header.

34. The terminal node of claim 29, wherein the information about the video application includes an indication of whether a streaming status of the video application is an initial buffering period.

35. A method for use in communicating between an access node and a terminal node, the method comprising:
establishing, a radio access network (RAN) control path between the access node and the terminal node, an APP-agent cooperative communication control path between an application agent in the access node and an application at the terminal node, and a data path between the access node and the terminal node, wherein the application is a video application that requests video data in a sequence of segments, the video data being available in multiple formats;
communicating from the terminal node to the access node, over the APP-agent cooperative communication control path, information about the video application at the terminal node, wherein the information about the video application includes estimated future capacity and occupancy of a video buffer at the terminal node used to playback the video data and is used to improve quality of experience for a user of the terminal node;
communicating from the access node to the terminal node, over the APP-agent cooperative communication control path, information about current capabilities for communication via the data path with the terminal node, wherein the information is used to improve the quality of experience for the user of the terminal node;
transmitting, from the terminal node to the access node over the data path, a request for application data in a format based on the estimated future capacity and the occupancy of the video buffer from an application server, the request being from the video application at the terminal node;
transmitting, from the access node over the data path, the request for the application data to the application server;
receiving, at the access node over the data path, the application data from the application server in response to the request for the application data; and
transmitting, from the access node to the terminal node over the data path, the application data received from the application server.

36. The method of claim 35, wherein the request for the application data includes characteristics based on the information about the current capabilities, the estimated future capacity, and the occupancy of the video buffer communicated on the APP-agent cooperative communication control path.

37. The method of claim 35, wherein the application data received from the application server is transmitted with characteristics based on the information about the current capabilities, the estimated future capacity, and the occupancy of the video buffer communicated on the APP-agent cooperative communication control path.

38. The method of claim 35, wherein the APP-agent cooperative communication control path uses long term evolution (LTE) radio access network (RAN) bearers.

39. The method of claim 35, wherein the APP-agent cooperative communication control path is communicated via a core network node.

40. The method of claim 35, wherein establishing an APP-agent cooperative communication control path includes communicating using broadcast or multicast Internet protocol (IP) addresses, discovering an IP address associated with the video application, and continuing communications on the APP-agent cooperative communication control path using the discovered IP address.

* * * * *